(12) United States Patent
Thompson

(10) Patent No.: US 7,810,295 B2
(45) Date of Patent: Oct. 12, 2010

(54) HURRICANE AND STORM PROTECTION LARGE WINDOWS AND DOORS

(76) Inventor: Thomas C. Thompson, 92-543 Kokole Pl., Makakilo, HI (US) 96707

( * ) Notice: Subject to any disclaimer, the term of this patent is extended or adjusted under 35 U.S.C. 154(b) by 0 days.

(21) Appl. No.: 09/690,657

(22) Filed: Mar. 2, 2001

(65) Prior Publication Data

US 2009/0007503 A1 Jan. 8, 2009

Related U.S. Application Data

(62) Division of application No. 09/032,560, filed on Feb. 27, 1998, now Pat. No. 6,131,354.

(51) Int. Cl.
*E04B 1/38* (2006.01)
(52) U.S. Cl. .............. 52/511; 52/509; 52/202; 49/67; 49/63; 248/300; 248/208; 403/353; 403/354; 403/348
(58) Field of Classification Search .......... 52/511, 52/509, 202, 162, 340, 351, 378, 745.21; 49/67, 63; 248/300, 208, 222.51, 222.52, 248/499, 551; 403/353, 354, 348, 384, 388
See application file for complete search history.

(56) References Cited

U.S. PATENT DOCUMENTS

| 1,102,079 | A | * | 6/1914 | Rizer | 248/551 |
|---|---|---|---|---|---|
| 1,489,038 | A | * | 4/1924 | McKee | 248/551 |
| 3,494,587 | A | * | 2/1970 | Kuhn | 248/551 |
| 4,351,139 | A | * | 9/1982 | Gander | 52/378 |
| 4,467,574 | A | * | 8/1984 | Falge et al. | 52/106 |
| 5,383,315 | A | * | 1/1995 | Birs | 52/202 |
| 5,456,443 | A | * | 10/1995 | Taaffe | 248/551 |
| D407,298 | S | * | 3/1999 | Hemphill | D8/367 |
| 6,138,975 | A | * | 10/2000 | McDaid | 248/499 |

FOREIGN PATENT DOCUMENTS

DE  25 12 779 A1 * 10/1976

* cited by examiner

*Primary Examiner*—Richard E Chilcot, Jr.
*Assistant Examiner*—Mark R Wendell

(57) ABSTRACT

An improved method and system of temporarily attaching a frame to a masonry building structure. A circular base mount is inserted into a circular sleeve, that has been pre-drilled into masonry by a coring bit. The masonry core is left in place. The circular base has contact with the inner surface of the core, the outer surface of the core, and the top of the core. Adhesive is used to permanently cement the base mount to the masonry core, providing abundant surface area for extra holding power. The base mount has a hooked top web for permanent or temporary connection to a female mount that is held in place to the base mount by rotation and locking. The female mount can be attached to a shutter, providing protection against hurricane winds.

13 Claims, 36 Drawing Sheets

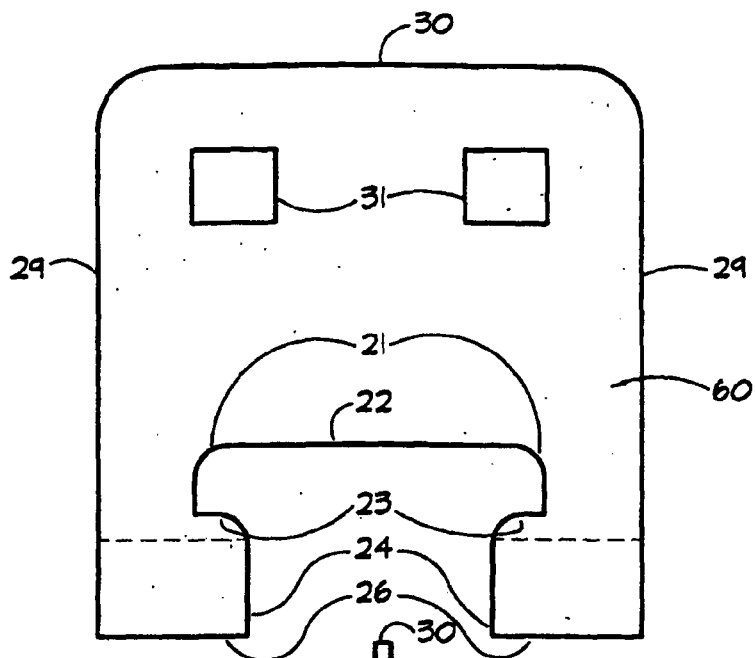
FIG. 13
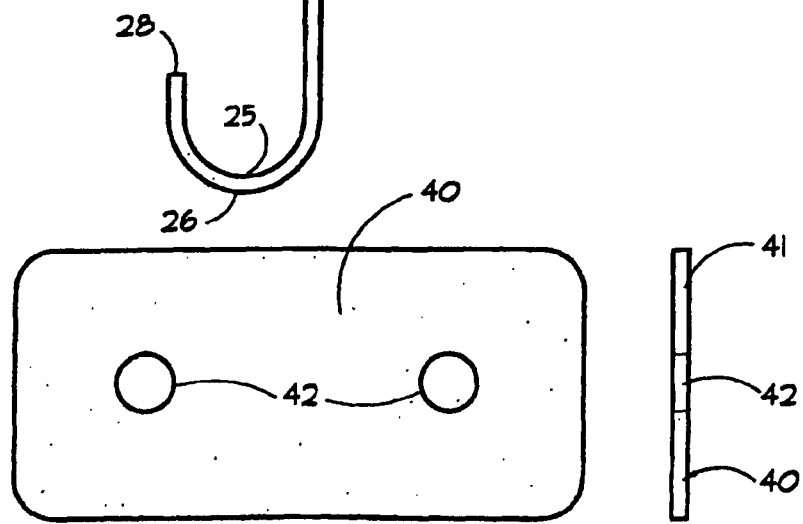
FIG. 14
FIG. 15
FIG. 16

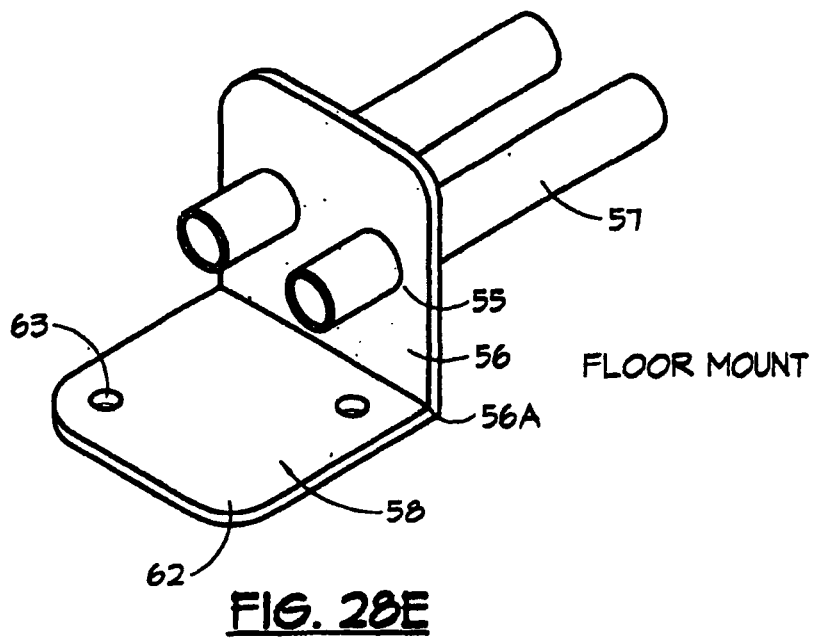
FIG. 28E  FLOOR MOUNT
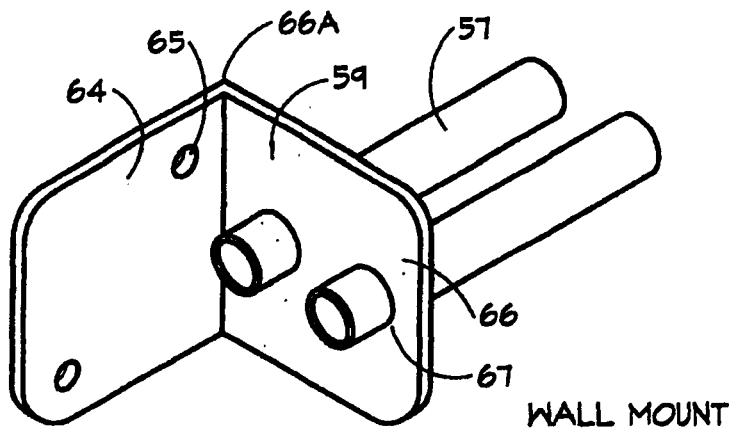
FIG. 28F  WALL MOUNT
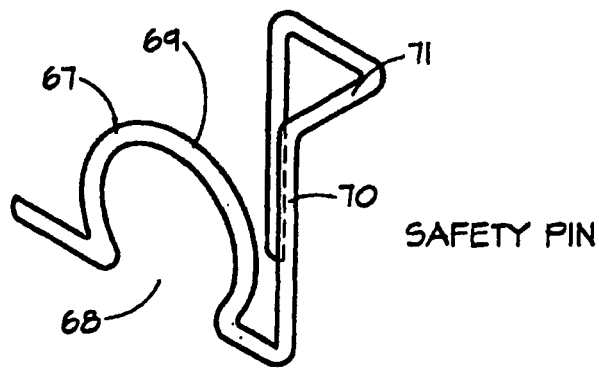
FIG. 28G  SAFETY PIN

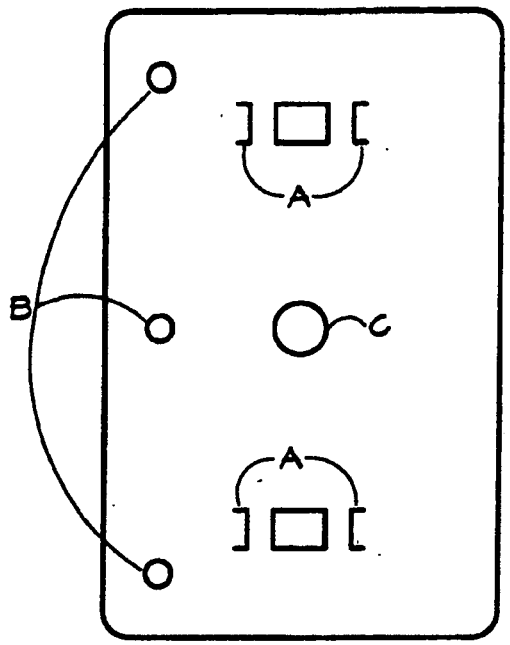
FIG. 45D
FIG. 45E
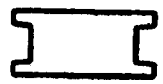
FIG. 45F
FIG. 45C
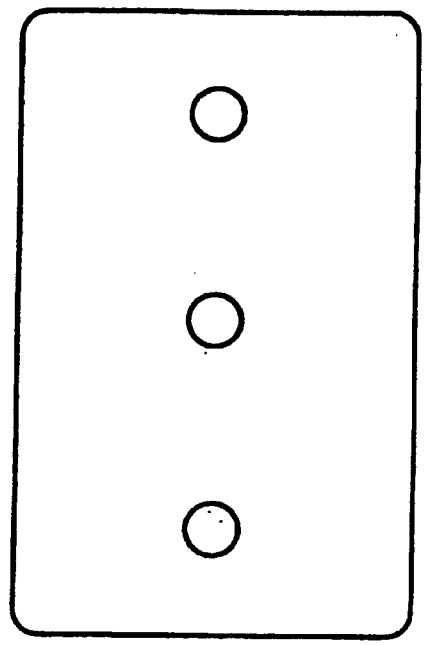
FIG. 45G

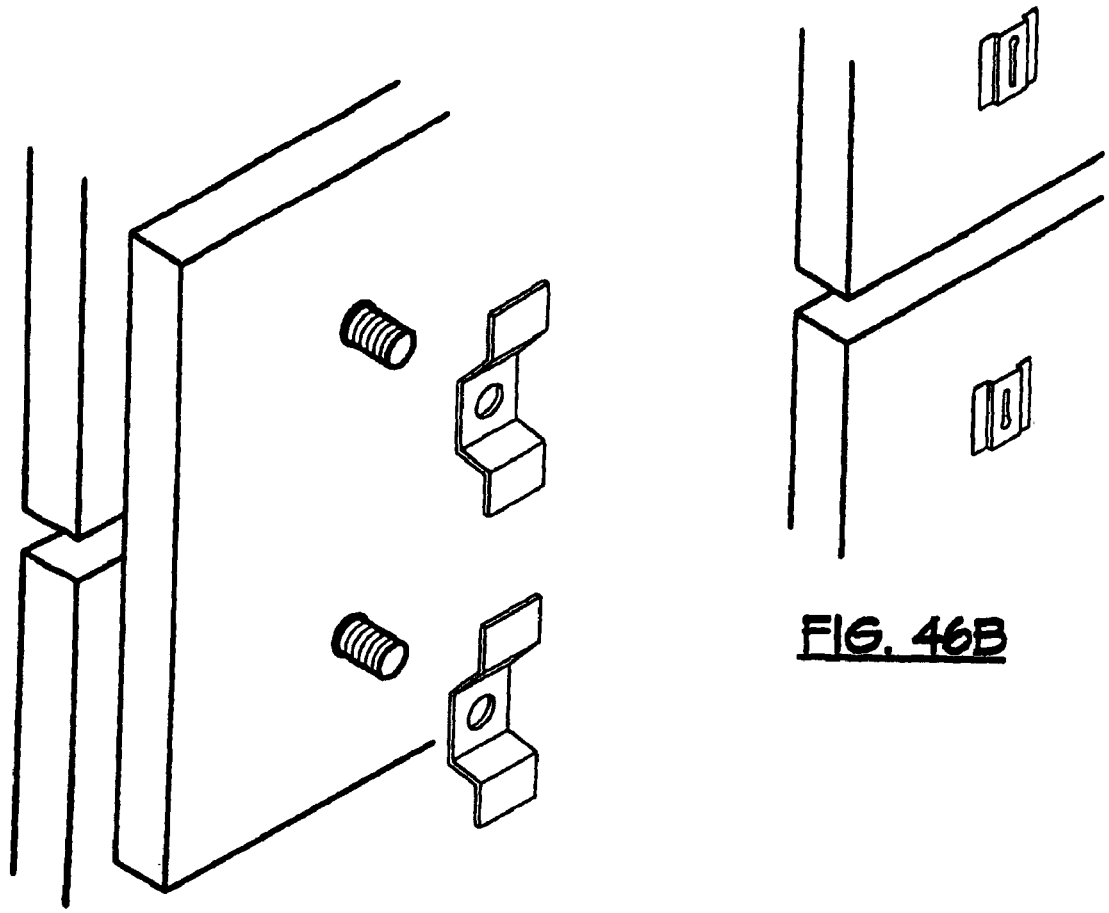
FIG. 46B
FIG. 46A
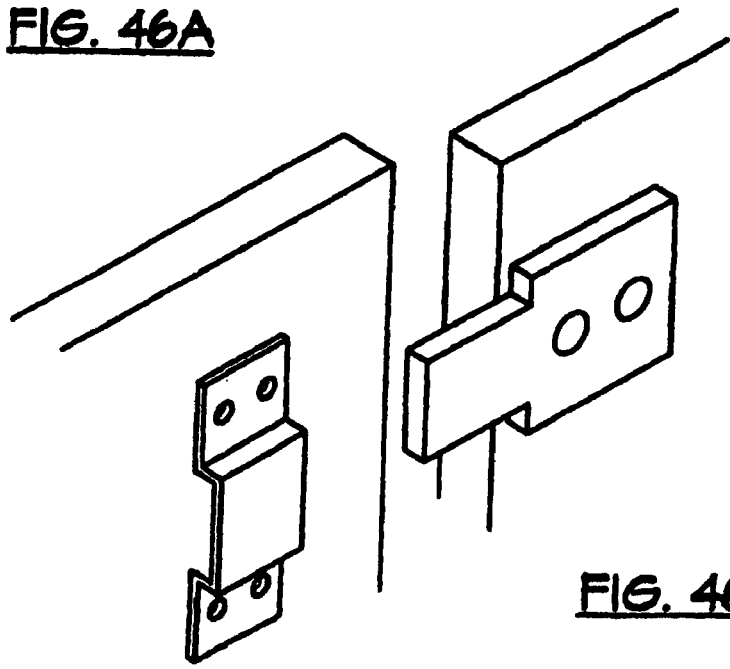
FIG. 46C

HURRICANE AND STORM PROTECTION LARGE WINDOWS AND DOORS

This is a Divisional of application Ser. No. 09/032,560, filed Feb. 27, 1998 now U.S. Pat. No. 6,131,354

BACKGROUND

1. Field of Invention

The invention relates to a shutter, fastener, and locking mechanism that provides an easy to install means of protecting large door and window openings from hurricanes, strong winds, rain, wind-blown debris, and vandals.

2. Description of Prior Art

Studies of damage from Hurricanes Hugo, Andrew, and Iniki show that most of the damage to a home was from the wind or wind-borne missiles that broke a window and let rain and wind into the home. Once the wind was inside a home, the resulting pressure helped lift the roof off the house. Shutters can help keep the wind and rain from entering a home during strong winds.

During Hurricane warnings, plywood is usually nailed over windows and patio doors to prevent wind-driven rain and debris from breaking the window and entering the house. Nailing sheets of plywood over windows is difficult on many homes, and it could take too much time to secure a cover over each window. Strong winds can rip down nailed-up plywood; and roll-down shutters and louvered shutters are also ineffective (Fine Homebuilding, 1992).

Homeowners are usually reluctant to drive nails into their window frames or do not want to be on a ladder during high winds. An individual can not hold up a large, heavy piece of plywood and nail it in at the same time. When a hurricane is expected, often the building suppliers run out of plywood.

Plywood nailed to a window frame can be blown out of a building due to the high pressure inside a building compared to the low pressure outside during high winds. This is due to the Bernoulli effects, where wind blowing around and over a building causes lower pressure than the high pressure air inside, and sucks out a window, wall, or roof.

An airplane rises due to the pressure differential of faster air moving over a wing, compared to the high pressure of slower moving air under a wing. So too does the side walls blow out of a house due to the Bernoulli effects of wind blowing perpendicular to the wall. Gable ends blow out of a house, because of higher pressure in the house compared to the extremely low pressure on the leeward edge of the wind direction.

Once the window, side wall, or gable end of a house is blown out, the rigidity of the roof and entire house is compromised due to wind getting into the house. Driven rain, along with the wind can damage everything in the house, along with damaging the structural integrity of the roof and walls of the house.

Previously, homeowners thought that they could prevent their walls from being blown out by opening windows to relieve the high pressure on the leeward and sides of a house, but the open windows on the windward side let in wind and rain. If windows are open on the leeward side only, the wind can rapidly change direction and blow into the windows. The wind must go somewhere, and would blow out the walls or roof as it sought a way out. The resulting damage negates any advantage of trying to ease the pressure differential.

This invention is simple to install, economical, and can fit on a wide variety of houses.

The current fad of testing shutters is by shooting a 2×4 into the shutter to test its strength. This simulates a roof rafter being blown into the shutter from a neighbor's house. My previous patent application Ser. No. 08/191,852 helps keep the rafter and roof on a house, and would prevent many of these missiles.

The factual odds of a 2×4 being blown head-on into a window shutter is minuscule. Actually, a 2×4 fired headed-on into a building would go through most wood-frame and concrete-block walls. Studies after Hurricane Andrew show that the most common projectile was roof shingles and roof tiles; and when roof tiles go airborne, they damage neighboring buildings (Miller, 1992).

One advantage of this invention is that any type of covering can be used for the shutter. Plywood was used in the past because it was readily available, strong, inexpensive, easy to store, and could be cut to fit windows by most homeowners using simple tools. The major problem was with the installation.

No one wanted to be on a ladder during windy conditions, especially trying to hold the heavy plywood sheet with one hand and trying to hammer a nail with the other. That leaves no hands to hold the nail or hold on to the ladder—an unsafe situation.

Plywood can still be used as the shutter material for this invention, but steel and other stronger, lighter, and cheaper materials can be used including new materials as they become available. Researchers testing shutter material claim that thin steel walls are more effective at stopping hurricane debris than thick wood, and the most effective material was 22-gauge steel backed with a thin layer of rubber (Civil Engineering, 1994).

This is good information, but thin sheets of steel with rubber are not readily available to a homeowner. Nevertheless, if it was obtainable, it could be used as the shutter material for this invention.

When thin sheets of steel are corrugated, pleated, or formed into parallel ridges, the resulting shutter cover is stronger than flat steel. Bending the sheets of steel work-hardens it and strengthens the bends. Corrugated metal sheets, used as a shutter cover, are stronger than steel with rubber, and could withstand larger and faster wind-blown missiles. Standard corrugated steel sheets may be used with this invention as a shutter cover, but this invention includes a unique corrugated metal shutter.

Other materials can also be used for the cover such as sheets of aluminum, which are light, recyclable, strong, non-rusting, and relatively easy to cut with power equipment. Kevlar©, fiberglass, rubber sheets, or any strong, lightweight material could also be used for the cover.

Bamboo has recently been used as flooring because it is attractive, wears well, and can be sanded and refinished. Bamboo can be weaved, is flexible and can bend, and can have resins added to make a product as strong as fiberglass. Unlike timber, bamboo is a plentiful grass that regenerates itself quickly from existing root systems after being cut. Bamboo forests are not clear-cut, but are maintained by harvesting mature stalks which makes room for new shoots to grow (Home Mechanix, 1995). In the tropics, bamboo would make a good cover for a shutter and would be environmentally attractive.

Shutters should be bolted to a building (Fine Homebuilding, 1992). During Hurricane Andrew, ¾-in. plywood bolted over a window sustained several hits from tree limbs, but nothing came through (Fine Homebuilding, 1992). Even with modern weather forecasting, there would not be enough time to bolt plywood to each window of a house. This invention has brackets permanently attached to the framing members of a house for quick and easy positioning of a shutter with companion hardware.

Concrete-block Houses

In Florida, most of the homes are made of concrete-block walls. The window and patio frames are not set flush with the outside wall, but are set part-way into the thick walls. Many of the window frames and patio doors are made of aluminum alloy and may not be secured correctly to the concrete-block.

To fit into the window opening, a sheet of plywood would have to be cut very accurately. Plywood boards stored for use during a hurricane could warp in the humid climate that is prevalent in Florida, and would not fit into the window opening without alterations.

Sometimes there is only a thin part of the window frame exposed in the window well opening. It is very difficult to nail or screw a sheet of plywood into the narrow exposed part of the window frame. Caulking may be set next to the window well and window frame, and there may be voids next to some window frames. Nails in caulk or voids would not form a secure fastening for the plywood board.

In a concrete-block wall, the window frame is not a structural member of the wall and does not provide any load of the roof, hence it is not very strong. This invention does not attach to the weak window frame of a concrete-block home, but instead attaches to the wall itself. Since the wall has about equal strength around the window, this invention can be mounted on the sides and bottom of the window.

By being attached to the concrete block outside the window well, the plywood sheet does not have to be cut accurately. Even if the board warped, it would still fit over the window well opening and keep out wind and rain. Only small brackets are permanently attached to the cinder block wall and they can be painted to match the wall.

Wood-frame Buildings

In many areas along the East and Gulf Coasts, outside of Florida, and in Hawaii, many of the homes are built of wood. There are two major types of wood-frame houses: platform or stud wall construction, and post-and-beam construction.

In platform framing, the wall sections consist of studs that support the roof or second floor. Wood framing around a window or door opening consists of headers and trimmers which are usually double (or more) the thickness of the wall framing. This extra framing helps provide structural rigidity to the wall, where the wall studs are missing from the window or door area.

On wood-framed houses, the window is sometimes flush with the outside sheathing, but may extend out beyond the sheathing and be framed with wood trim. The header board above the window provides a strong attaching point to affix the hinge plate of this invention. Doors would have similar construction framing and a patio door (sliding-glass) and garage door would have stronger headers and trimmers.

In Hawaii and the Caribbean, many of the homes are built using post-and-beam construction. One of the chief structural advantages of this type of construction is the simplicity of framing around door and window openings.

Since the roof loads are carried by fewer, but stronger timbers, large openings can be framed without the need for headers. Wide window walls are formed by merely inserting window frames between the posts and beams.

Some windows are fixed or non-opening windows which provide daylight and a view of the outdoors. Jalousie windows are also common in tropical areas because they provide excellent ventilation. Both windows are weak against wind and rain, and must be protected by shutters during high winds.

Some houses in Hawaii and the Caribbean have jalousie wood louvers under large non-opening windows that provide ventilation. Shutters are also needed on these louvers to protect them from strong winds, and prevent wind and rain from entering the house.

On post-and-beam houses, the window frame is commonly extended out beyond the outside sheathing and framed with wood trim pieces. The beam above the window provides a strong anchor point for the locks of this invention. The bottom and side frame of the window, which attaches to the posts, forms a strong attaching point for the latching mechanism.

DESCRIPTION OF PRIOR ART

A number of shutter systems are presently marketed to homeowners that are permanently attached to the house. Some of these shutters roll down over a window from an attached compartment, and some are screwed in. Many homeowners dislike prior shutters for many reasons, but mostly because they are complicated, heavy, unreliable, expensive, take a lot of time to deploy, take tools to deploy, or do not match the color and architecture of the house.

Several recent types of shutter systems have been patented including U.S. Pat. No. 4,248,022 (1981) to Walker, U.S. Pat. No. 4,333,271 (1982) to De Paolo et al, U.S. Pat. No. 4,384, 436 (1983) to Green, U.S. Pat. No. 5,228,238 (1993) to Fenkell, U.S. Pat. No. 5,335,452 (1994) to Taylor, U.S. Pat. No. 5,345,716 (1994) to Caplan, U.S. Pat. No. 5,347,775 (1994) to Santos, and U.S. Pat. No. 5,383,315 (1995) to Birs.

All are good inventions, but they are not inexpensive, they are not simple, they contain complex hardware, they cannot be installed quickly, they cannot fit wood, concrete-block, and masonry houses, they cannot be installed on the top, bottom, or side of a window, they cannot use different types and thicknesses of material for the shutter, they cannot be installed on the inside of a house, some are too thick to be stored easily, and the hardware is bulky and unattractive on a house.

OBJECTS AND ADVANTAGES

Objects of this invention are to easily, quickly, and economically protect windows, doors, and houses from the destructive winds of hurricanes. It is a further object of this invention that the shutters will not be permanently attached to the house, except for modest plates.

Another objective is to make the installation procedure simple, so that a handy homeowner can install the shutter hardware. A further object is that this invention can be used on various size window and door openings, and various types of houses. Another objective is the shutter can be made out of any material including plywood, steel, corrugated steel, aluminum, bamboo, Kevlar©, fiberglass, rubber sheets, or any strong, lightweight material.

A still further object is for the invention to be retro-fit onto new and old homes made of wood, concrete-block, or masonry. Another object is for the shutters to be installed on patio doors, such as in multi-story apartment houses, where they cannot be reached from the outside.

Another object is to retain the shutter cover over the window and door to prevent vandalism after a hurricane has passed. Further objects and advantages of my invention will become apparent from a consideration of the drawings and ensuing description.

These and other objectives of the invention are achieved by a system of simple and economical connectors that allow a homeowner to quickly and easily protect a window or door with a strong covering.

This invention includes several embodiments in order to fit on wood, concrete-block, and masonry houses. Some embodiments are specialized for the type of house; some can be installed in a vertical or horizontal position and some can be installed above, below, or to one side of the window. Several embodiments also use different manufacturing techniques including manipulated sheet metal, casting, forging, extrusion, and plastic molds or injection. Advantages of each will be discussed in the description.

This invention uses parts from my previous patent application Ser. No. 08/597,194. The Provisional Patent application for this patent is No. 60-038,338 of Feb. 27, 1997.

BRIEF DESCRIPTION OF DRAWINGS

FIG. 13 shows a top view of a plywood bracket after bending.

FIG. 14 shows a side view of a plywood bracket after bending, showing the J-shape.

FIG. 15 shows a front view of the washer that adds strength to the shutter cover.

FIG. 16 shows a side view of a washer.

FIGS. 45C-G show more plywood latch embodiments.

FIGS. 46A-C show the plywood latch embodiments on plywood sheets.

REFERENCE NUMERALS IN DRAWINGS

Figure 1:
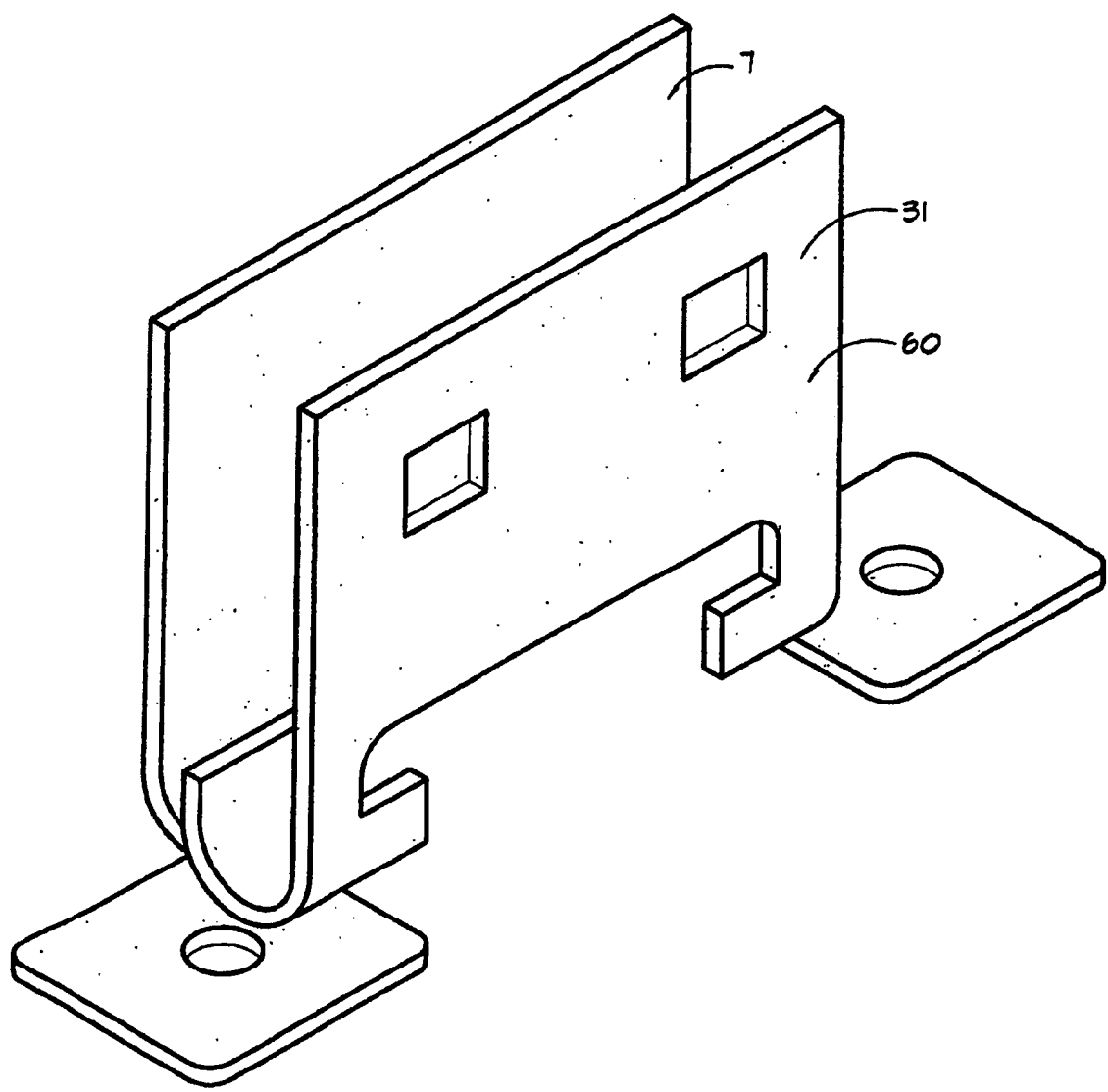
FIG. 1 shows a perspective view of a floor mount and plywood bracket.

1 Bayonet
2 Radiused bends
3 Top side
4 Notch
5 Bolt hole
6 Base
7 Floor mount
8 Wall plate
9 Side edge
10 Top edge
11 T-bar
12 Radiused right-angle bend
13 Topper edge
14 Bayonet bend
15 Core mount
16 Cap
17 Heavy-duty core bracket
18 Swan mount
19 Duck mount
20 T-sides
21 T-curves
22 T-top
23 T-notch
24 T-shaped opening
25 Trough bend
26 Outer trough bend
27 J-side
28 J-top
29 Sider edge
30 Tops edge
31 Carriage bolt hole
32 Rib
33 Cap
33A Start bend
33B End bend
34 Gooseneck bend
35 Head
36 Web
36A Web top
37 Overthrust bend
38 Web bend
39 Heavy-duty clip
40 Washer
41 Washer side
42 Bolt hole
43 Slit skirt
43A Skirt bend 44 Slit skirt cut-outs
45 Carriage bolt
46 Nut
47 Rear bend
48 Shutter cover
49 Rear web
50 Circular bend
51 Skirt
52 Radius notches
53 Stress relievers
54 Pipe clip
55 Pipe holes
56 Rear tab
56A Rear tab bend
57 Pipe
58 Pipe floor mount
59 Pipe wall mount
60 Plywood bracket
61 Back
62 Floor web
63 Bolt holes
64 Wall web
65 Bolt holes
66 Nose tab
66A Nose tab bend
67 Safety pin
68 Tight opening
69 Wrap
70 Tang
71 Opposite tang
72 Midspan wall mount
73 Wall-span
74 Dog tab
74A Dog tab bend
75 Bolt holes
76 Pipe holes
77 Mid-span floor mount
78 Floor span
79 Bolt holes
80 Cat tab
80A Cat tab bend
81 Pipe holes
82 Triangular wall mount
83 Bracket
84 Offset floor mount
85 Party floor mount
86 Bolt holes
87 Lip
88 Hook latch
89 Semi-circle base
90 Catch opening
91 Latch top
92 Base hook latch
93 Latch tab bend
94 Latch tab
95 Base plate
96 Bolt hole
97 Mid-span floor latch
98 Latch span
99 Latch cut-outs
100 Twist mount
101 Twist bend
102 Pipe hole
103 Wing tab
104 Twist dock
105 Lip dock
106 Circle dock
107 Single mid-span floor latch
108 Receiver
109 Tongue
110 Bolt hole
111 Adjustable bolt hole
112 Bolt hole
113 Ess bends
114 Flare out bend
115 Tee retainer
116 Sandwich plate
117 Lips
118 Nail holes
119 Bolt hole
120 Bolt holder
121 Thin clip
122 Carriage hole
123 Carriage bolt
124 Inner sandwich plate
125 Wingnut
126 Sheet
127 Keyhole brackets

DESCRIPTION AND OPERATION

FIG. 1

FIG. 1 shows a perspective view of a floor mount 7 and plywood bracket 60 locked together at the bottom. The locking mechanism will be shown and explained in other figures. The shutter cover 48 is omitted from this view, but would be attached to the plywood bracket 60 using carriage bolts 45 through carriage bolt holes 31. It can be seen that the floor mount 7 and plywood bracket 60 would sandwich the shutter cover 48 providing abundant much more surface holding power than many nails.

FIG. 2

Figure 2:
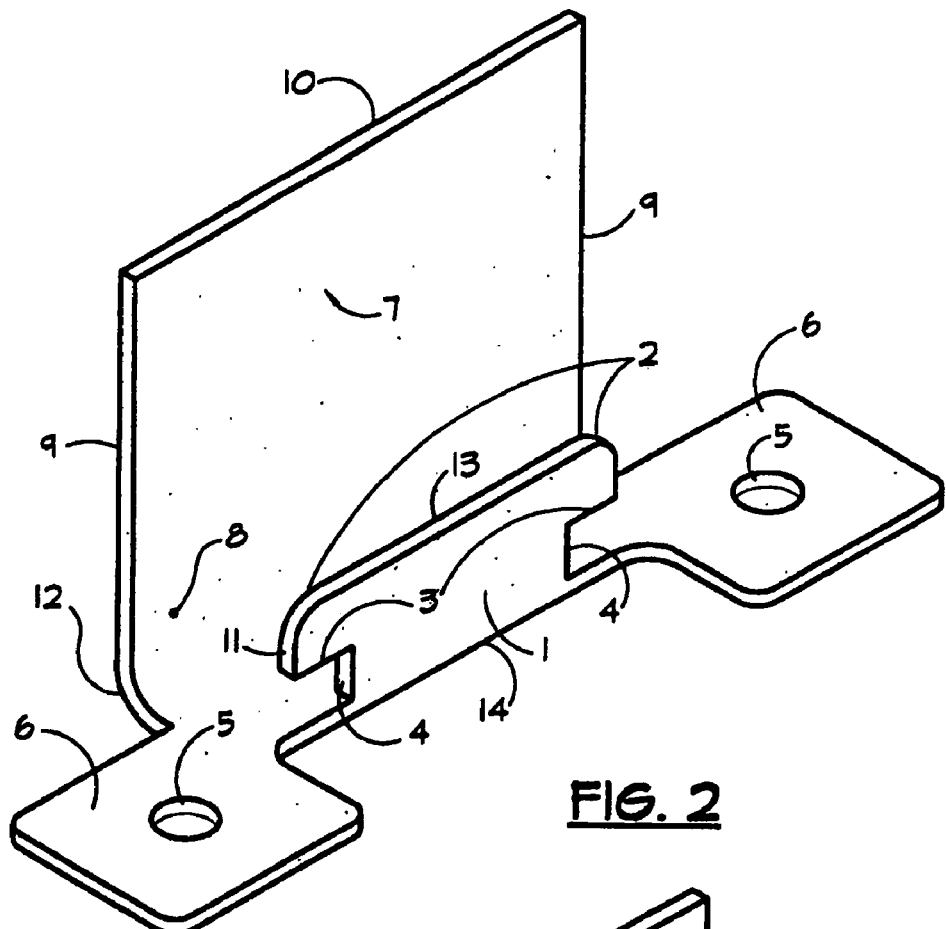
FIG. 2 shows a perspective view of a floor mount.

Refer now to FIG. 2 which shows a perspective view of a floor mount 7. The one-piece floor mount 7 consists of a base 6, on either end, with a bolt hole 5. In between each base 6 is a bayonet 1 that is bent up at a right angle at the bayonet bend 14. The bayonet 1 is T-shaped with the top edge 13 having radiused bends 2 at the end forming a T-bar 11. Under the T-bar 11, a notch 4 has a top side 3.

At the rear of the floor mount 7, a radiused right-angled bend 12 forms the wall plate 8 with side edge 9 and top edge 10. The wall plate 8 and bayonet 1 are generally parallel to each other.

FIG. 3

Figure 3:
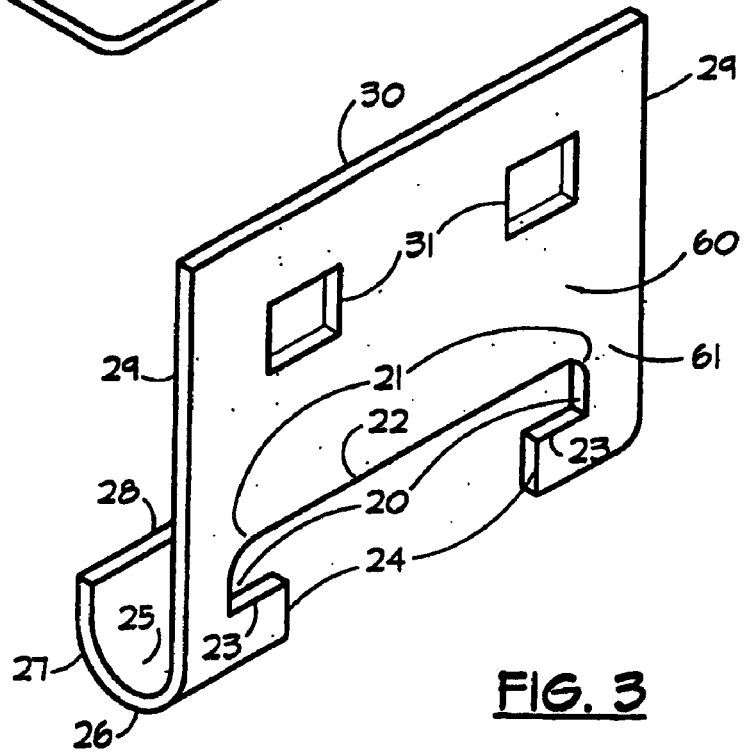
FIG. 3 shows a perspective view of a plywood bracket.

Refer now to FIG. 3 which shows a perspective view of a plywood bracket 60. The one-piece plywood bracket 60 is J-shaped in profile, and consists of a back 61 and trough bend 25. The back 61 has straight sider edges 29, tops edge 30, carriage bolt holes 31 near the top and T-shaped opening edges 24 near the center bottom.

The T-shaped opening 24 has a similar shape as the bayonet 1 on the floor mount 7, but is slightly larger. The T-top 22, T-curves 21, T-sides 20, and T-shaped opening 24 allow the bayonet 1 to hook through with the notch 4 locking onto the T-notch 23.

The trough bend 25 has a T-shaped opening 24 opposite the T-shaped opening 24 on the back 61, but is hidden in this view. It is shown on FIG. 12 of the full pattern layout. The trough bend 25 allows the plywood bracket 61 to rock up into a locked position by lifting on the shutter cover 48 (not shown here). The plywood bracket 61 rocks on the outer trough bend 26 and the J-side 27 and J-top 28 completes the trough bend 25.

Figure 4:
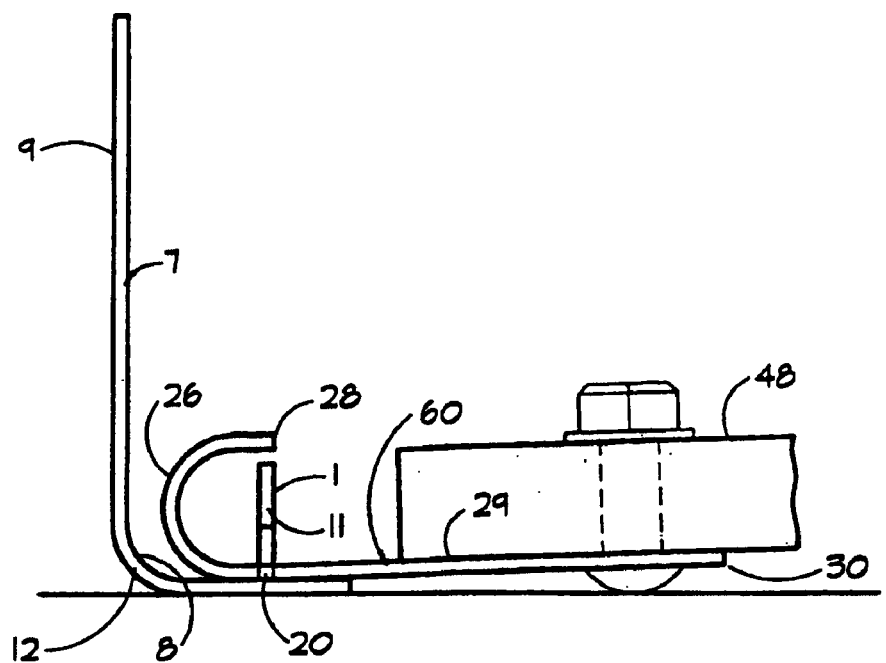
FIG. 4 shows a side view of a plywood bracket and shutter cover.

Once the plywood bracket 61 is placed on the floor mount 7, as shown in side view on FIG. 4, and rotated up, as shown in FIG. 1, the T-shaped opening edges 24 lock under the top side 3 of the floor mount 7.

FIG. 4

Refer now to FIG. 4 which shows a side view of a plywood bracket 60 placed on a floor mount 7, prior to locking. On the plywood bracket 60, a shutter cover 48 is mounted to the side edge, 29 using a carriage bolt 45, nut 46, and washer 40. The bayonet 1 of the floor mount 7 is shown inserted between the T-sides 20 of the plywood bracket 60.

FIG. 5

Figure 5:
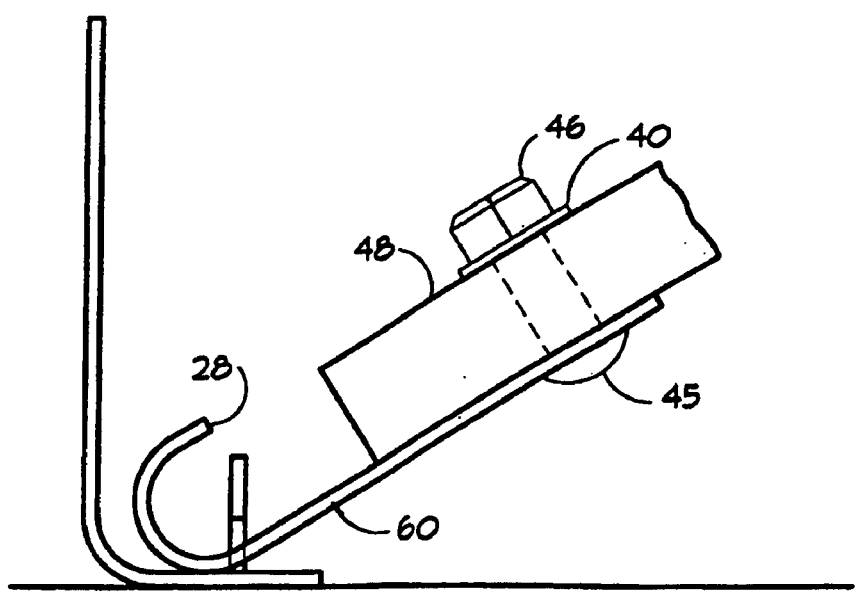
FIG. 5 shows the plywood bracket attached to the floor mount.

Refer now to FIG. 5 which shows the shutter cover 48 attached to the plywood bracket 60 with carriage bolt 45, nut 46, and washer 40. The shutter cover 48 is lifted into position to cover a large window or door. Notice that the J-top 28 is upward.

FIG. 6

Figure 6:
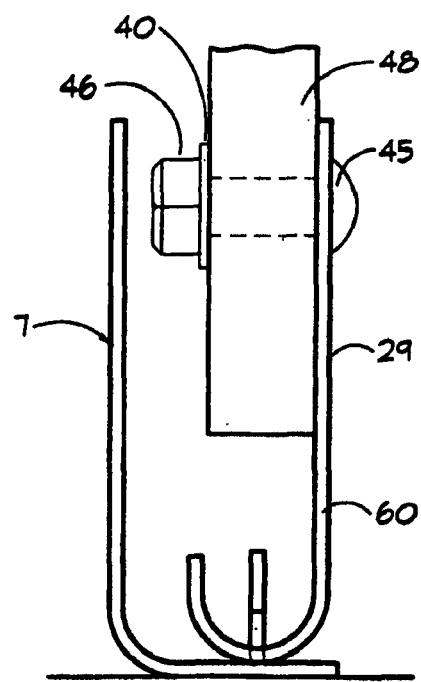
FIG. 6 shows the plywood bracket and shutter cover locked into position onto the floor mount.

Refer now to FIG. 6 which shows the shutter cover 48 locked into position and covering a large window or door. Notice the head of the carriage bolt 45 faces away from the window. This is a side view of the perspective view shown in FIG. 1. FIG. 6 shows the shutter cover 48 attached to the plywood bracket 60 using a carriage bolt 45, nut 46, and washer 40.

For extra clearance between the shutter cover 48 and the window, the shutter cover 48 can be bolted to the outside of the sider edge 29. FIG. 6 shows the shutter cover 48 attached to the inside of the sider edge 29, above the trough bend 25. The shutter cover 48 can also be bolted to the outside of the sider edge 29 so that in this view, the shutter cover 48 would be on the right side of the sider edge 29. This would provide for overlapping of the shutter covers 48 when the window or door is large and a single sheet of plywood could not completely cover the glass.

FIG. 7

Figure 7:
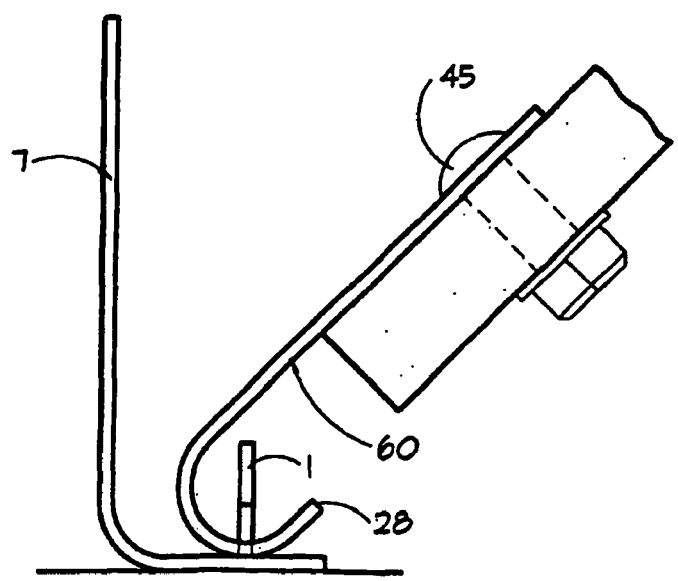
FIG. 7 shows the plywood bracket being lifted into a face position.

Refer now to FIG. 7 which shows the plywood bracket 60 being lifted into position to cover a large window or door. Notice that the J-top 28 is downward as compared to FIG. 7. Since the t-shaped opening 24 is on both sides of the outer trough bend 26 (see FIG. 12), the plywood bracket 60 can latch on to the bayonet 1 with the J-top 28 facing the window or away from the window. This provides for warped shutter covers 48 so either side can face the window. Also, if the threads of the carriage bolt 45 are too long, the head of the carriage bolt 45 can face the window.

FIG. 8

Figure 8:
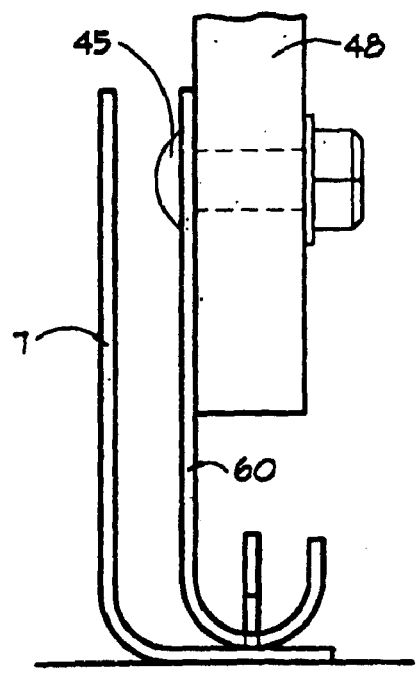
FIG. 8 shows the plywood bracket and attached shutter cover locked into a face position.

Refer now to FIG. 8 which shows the plywood bracket 60 and attached shutter cover 48 locked into position. The top part of the shutter cover is attached to the wall with locks. Note that the head of the carriage bolt 45 is next to the floor mount 7 as compared to FIG. 6.

FIG. 9

Figure 9:
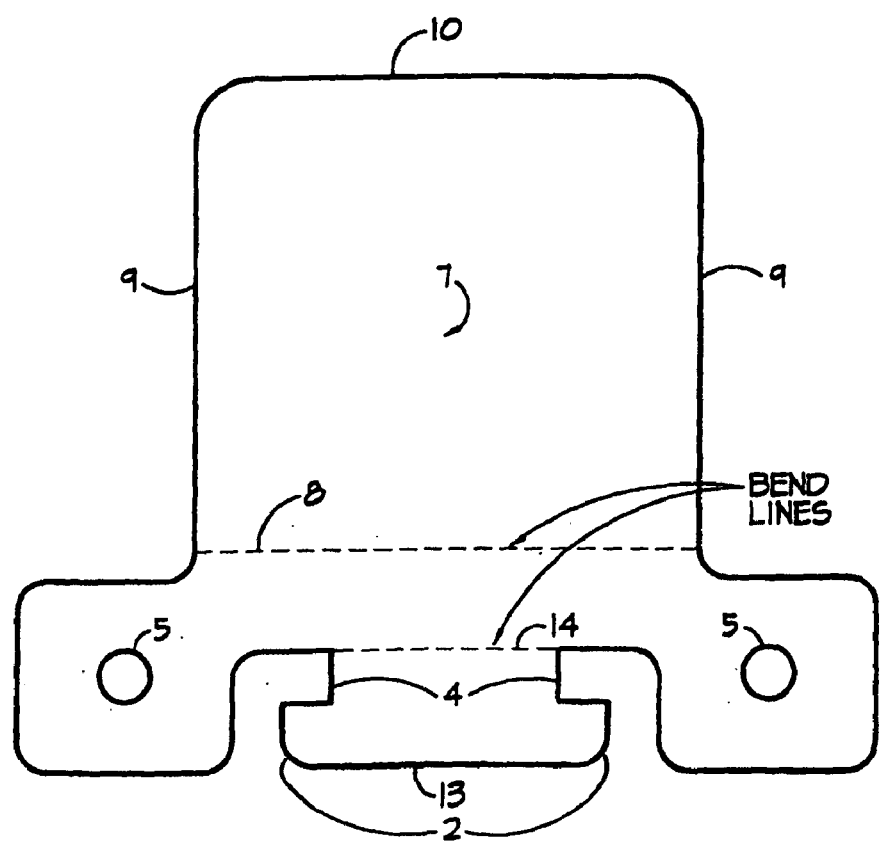
FIG. 9 shows a flat pattern layout of a floor mount prior to bending.

Refer now to FIG. 9 which shows a flat pattern layout of a floor mount 7 prior to bending. All parts and bend lines are labeled.

FIG. 10

Figure 10:
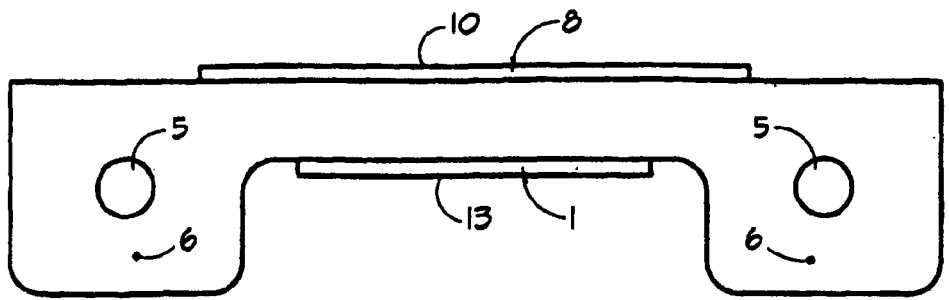
FIG. 10 shows a top view of a floor mount after bending.

Refer now to FIG. 10 which shows the a flat pattern layout of a floor mount 7 after bending. The topper edge 13 of the bayonet 1 now faces the viewer, along with the top edge 10 of the wall plate 8.

FIG. 11

Figure 11:
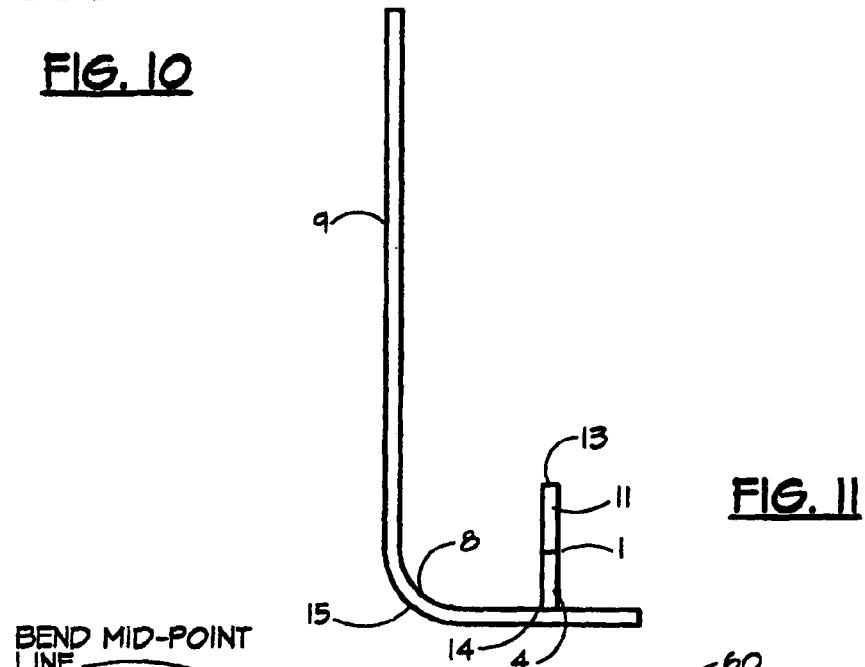
FIG. 11 shows a side view of the floor mount after bending.

Refer now to FIG. 11 which shows a side view of the floor mount 7 after bending. This view shows the radiused right-angle bend 12 and the sharp bayonet bend 14.

FIG. 12

Figure 12:
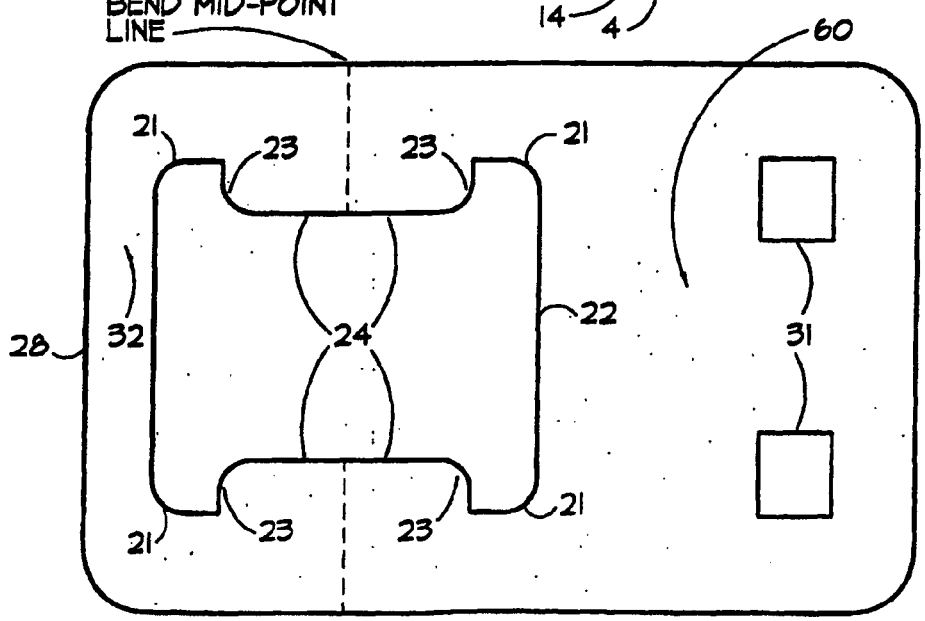
FIG. 12 shows a flat pattern layout of a plywood bracket prior to bending.

Refer now to FIG. 12 which shows a flat pattern layout of a plywood bracket 60 prior to bending. All parts and the bend line are labeled. This shows the T-shaped opening 24 will be on both sides of the trough bend 25 after bending.

FIG. 13

Refer now to FIG. 13 which shows a front view of a plywood bracket 60 after bending. One can look clear through the T-shaped opening 24.

FIG. 14

Refer now to FIG. 14 which shows a side view of a plywood bracket 60 after bending, showing the J-shape.

FIG. 15

Refer now to FIG. 15 which shows a front view of the washer 40 that adds strength to the shutter cover 48. Carriage bolts 45 go through carriage bolt holes 31, through the shutter cover 48, through the bolt holes 42, and into the nuts 46. The washer 40 prevents the shutter cover 48 from splintering, distributes stresses a wide area, and prevents pullout of the nut 46.

FIG. 16

Refer now to FIG. 16 which shows a side view of a washer 40 and the washer side 41, and bolt holes 42.

FIG. 17

Figure 17:
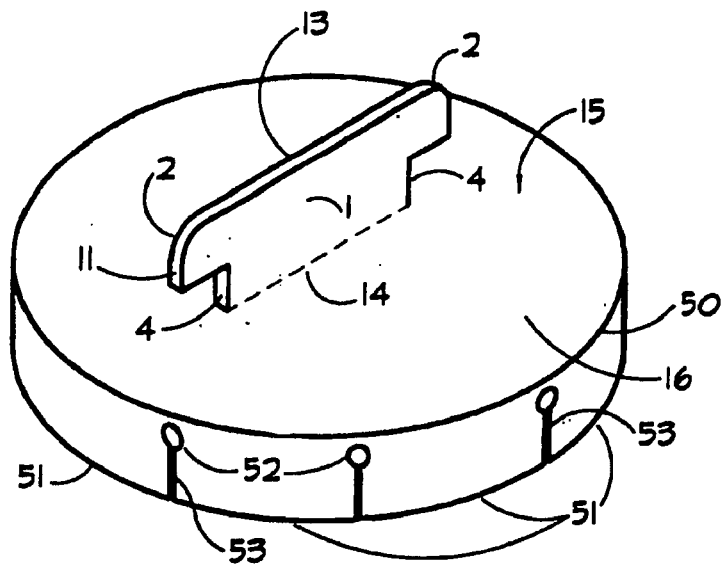
FIG. 17 shows an embodiment of a core mount that can be epoxied to a concrete floor.

Refer now to FIG. 17 which shows an embodiment of a floor mount 7 that can be epoxied to a concrete floor, as would be found on a patio outside and apartment or condo. The core mount 15 has a bayonet 1 on the top, the same bayonet 1 as described in FIG. 2. The bayonet 1 is bent up from the cap 16 by the right-angled bayonet bend 14. The bayonet contains a notch 4, T-bar 11, radiused bends 2, and topper edge 13.

The cap 16 has a circular bend called the circumference bend 50 around the circumference. Adjacent to the bottom edge of the circumference bend 50 are a series of radius notches 52 and stress relievers 53. The radius notches 52 and stress relievers 53 form skirts 51 that are perpendicular to the cap 16. The radius notches 52 and stress relievers 53 help prevent the cap from distorting during bending of the circumference bend 50.

A coring bit with the same diameter as the cap 16 is used to drill a core hole in the concrete floor next to the patio door. After sufficient depth, the drill is removed but the core of the concrete remains, forming a circle in the concrete. This keeps the strength and integrity of the concrete, while providing extra surface area for the epoxy to adhere to.

Once the core circle is drilled, epoxy and the core mount 15 are inserted into the core circle. The skirts 51 are inserted into the core circle and the radius notches 52 and stress relievers 53 provide more edges for the epoxy to hold. The inner and outer surfaces of the skirts 51 provide edges for epoxy to grab. Also, any extra epoxy will grab onto the bottom surface of the cap 16.

Although the floor mount 7 could be mounted in the midpoint of a patio door, the wall plate 8 of the floor mount 7 may be hit by shoes of people walking out the patio door. The wall plate 8 could be eliminated, but it adds strength to the floor mount 7. The core mount 15 has strength from the cap 16 and skirts 51, so it could be used in the midpoint of a patio door.

Figure 20:
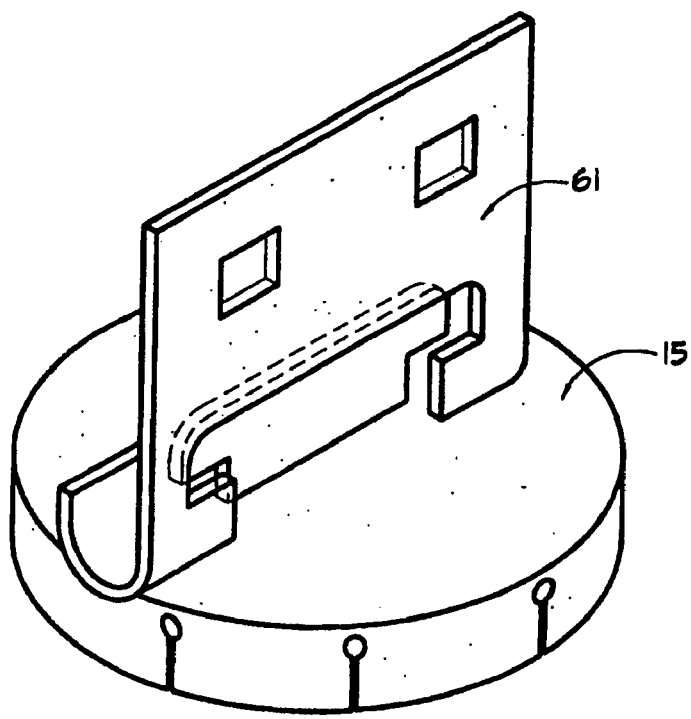
FIG. 20-21 show a flat pattern layout of another embodiment of a core mount.

A plywood bracket 61 and attached shutter cover 48 could be latched and locked onto the bayonet 1 of the core mount 15 as shown in FIG. 20.

FIG. 18

Figure 18:
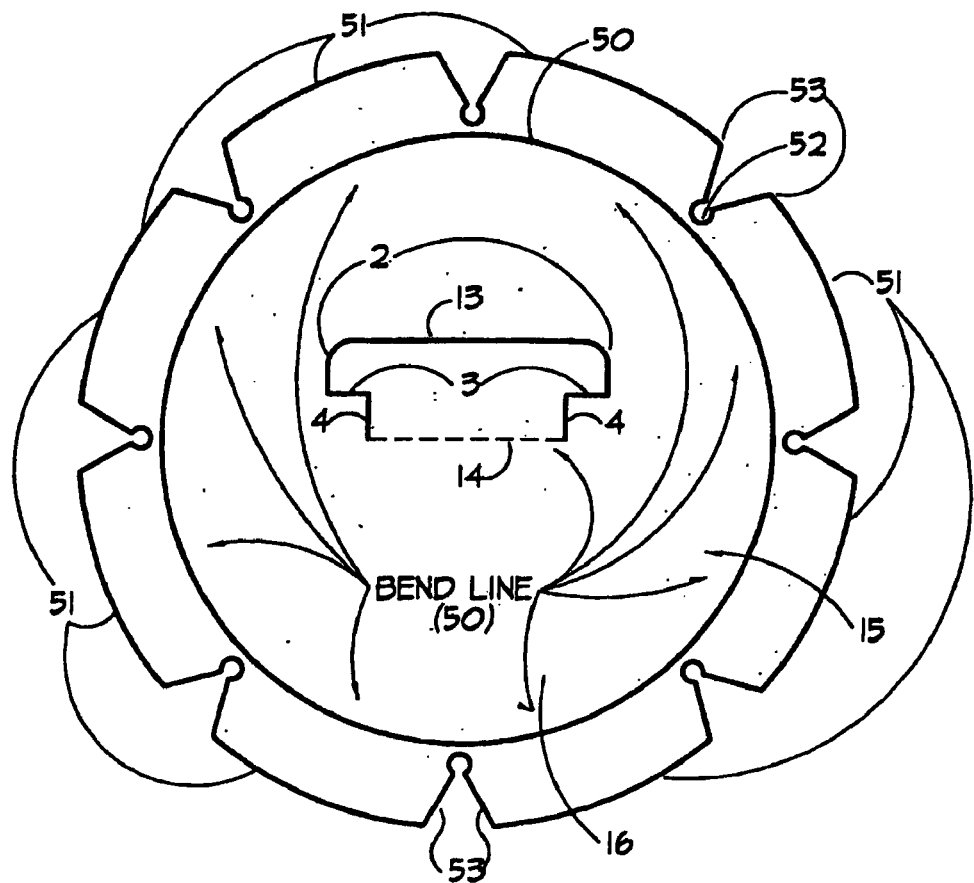
FIG. 18 shows a flat pattern layout of a core mount prior to bending at the bayonet bend and circumference bend.

Refer now to FIG. 18 which shows a flat pattern layout of a core mount 15 prior to bending at the bayonet bend 14 and circumference bend 50. Other parts are labeled as in FIG. 17.

FIG. 19

Figure 19:
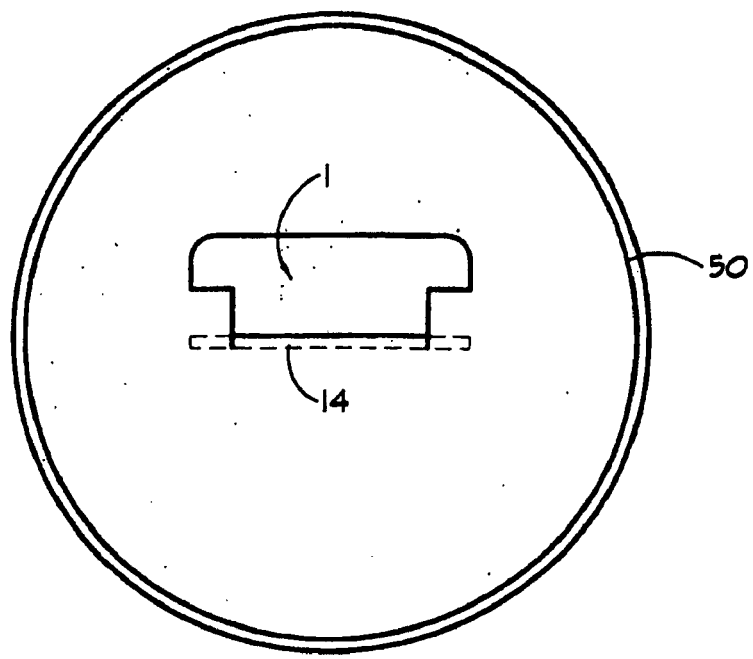
FIG. 19 shows a top view of a core mount after the circumference bend has been completed.

Refer now to FIG. 19 which shows a top view of a core mount 15 after the circumference bend 50 has been completed. The bayonet bend 14 will bend the bayonet 1 cutout up toward the viewer, shown by the dashed lines.

FIG. 20

Refer now to FIG. 20 which shows a perspective view of a core mount 15 after a plywood bracket 61 has been latched and locked into position. The shutter cover 48 is omitted from this view for clarity.

FIG. 21

Figure 21:
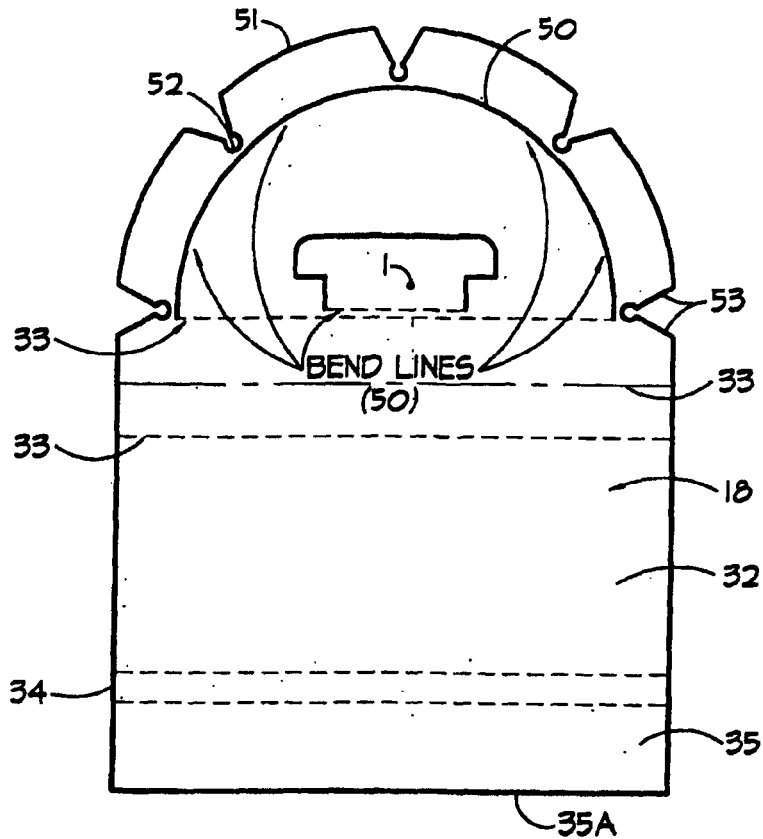

Refer now to FIG. 21 which shows a flat pattern layout of another embodiment of a core mount 15. The two-piece heavy-duty core bracket 17 uses the bayonet 1 of the floor mount 7, and the circumference bend 50, skirts 51, radius notches 52, and stress relievers 53 of the core mount 15.

FIG. 21 shows the flat pattern layout of a swan mount 18 prior to bending. The top part of the swan mount 18 is identical to about ½ of a core mount 15 as shown in the top half of FIG. 18. The bayonet 1 is shown near the center, with the circumference bend 50, radius notches 52, stress relievers 53, and skirts 51.

The bottom part of the swan mount 18 contains a rib 32 with a series of parallel bend lines. The cap bend 33 is a right-angle radius bend that forms the bulk of the rib 32 upward. The bend starts at the start bend 33A and ends at the end bend 33B, forming a gradual bend instead of a sharp bend. At the top of the rib 32, a gooseneck bend 34, containing a sharp overlapping bend, forms the head 35 and top head 35A.

A core drill is used to drill a core circle for epoxy and insertion of the skirts 51 of the swan mount 18, similar to insertion of the core mount 15 (FIG. 17). Only ½ of the core circle is filled, as the duck mount 19 is inserted in the other half of the core circle, completing a two-piece heavy-duty core bracket 17.

FIG. 22

Figure 22:
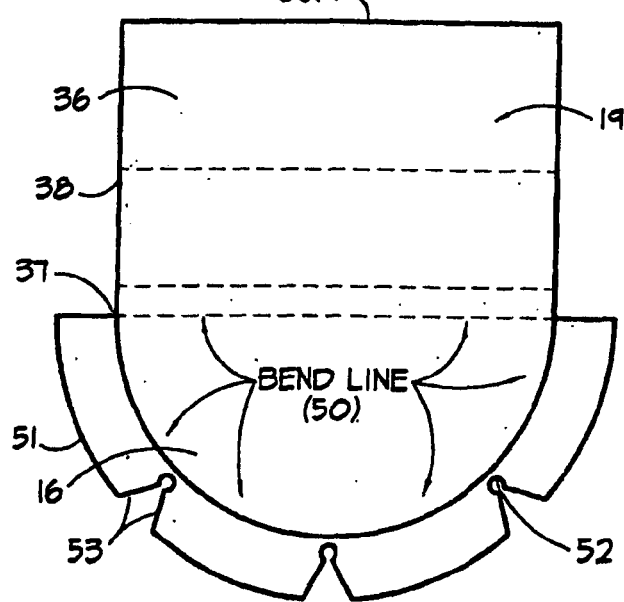
FIGS. 22-26A show the duck mount and swan mount.

Refer now to FIG. 22 which shows a flat pattern layout of a duck mount 19 prior to bending. The bottom part of the duck mount 19 is identical to about ½ of a core mount 15, except the bayonet 1 is missing. The circular bend 50, radius notches 52, stress relievers 53, and skirts 51 are similar to the swan mount 18 and core mount 15.

The top half of the duck mount 19 contains a web 36 with sharp bends. The overthrust bend 37 bends the web 36 on top of the cap 16. The right-angled web bend 38 bends the web 36 perpendicular to the cap 16, and ends with the web top 36A.

FIG. 23

Figure 23:
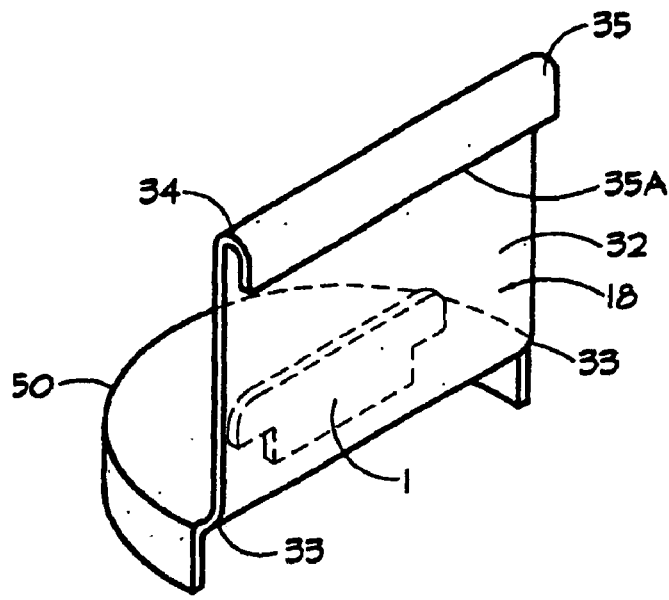

Refer now to FIG. 23 which shows a perspective view of a swan mount 18 after bending. The bayonet 1 is hidden from view and is dashed. The circumference bend 50 and skirts 51 are shown away from the viewer. The cap bend 33, rib 32, gooseneck bend 34, head 35, and top head 35A are shown toward the viewer. The base of the swan mount 18 is only about ½ a circle.

FIG. 24

Figure 24:
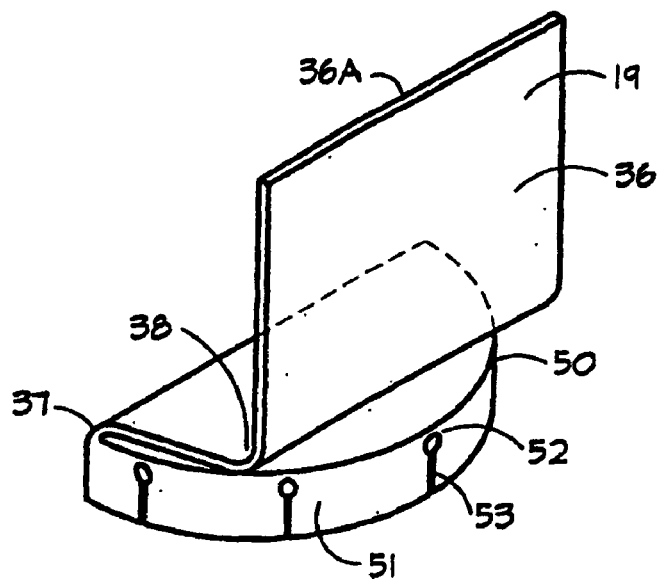

Refer now to FIG. 24 which shows a perspective view of a duck mount 19 after bending. The circumference bend 50, radius notches 52, stress relievers 53, and skirts 51 are shown toward the viewer. The overthrust bend 37 and web bend 38 form the web 36 and web top 36A.

FIG. 23A

Refer now to FIG. 23 which shows a perspective view of a swan mount 18 about to be put to a duck mount 19. The gooseneck bend 34 will capture the web top 36A of the duck mount 19, and the rib 32 will be against the web 36 of the duck mount 19.

FIG. 24A

Figure 24A:
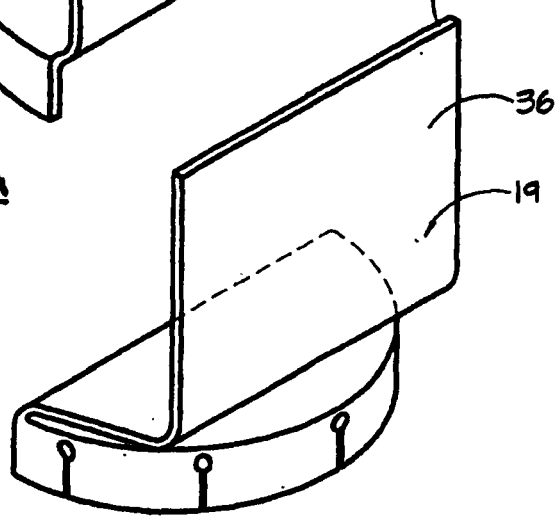

Refer now to FIG. 24A which shows a perspective view of a duck mount 19 about to be united with a swan mount 18.

FIG. 24B

Figure 23A:
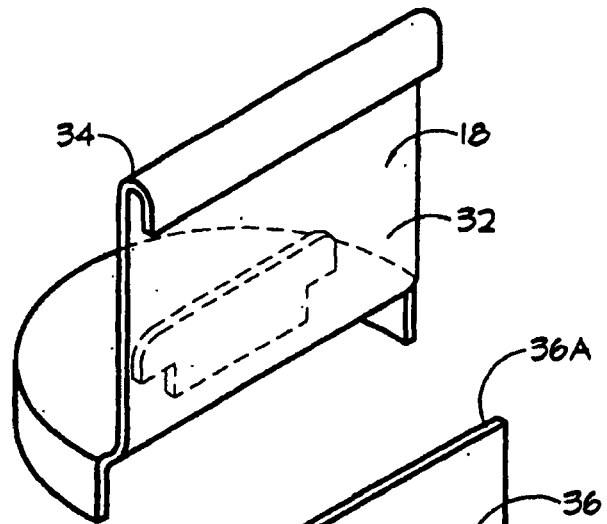
Figure 24B:
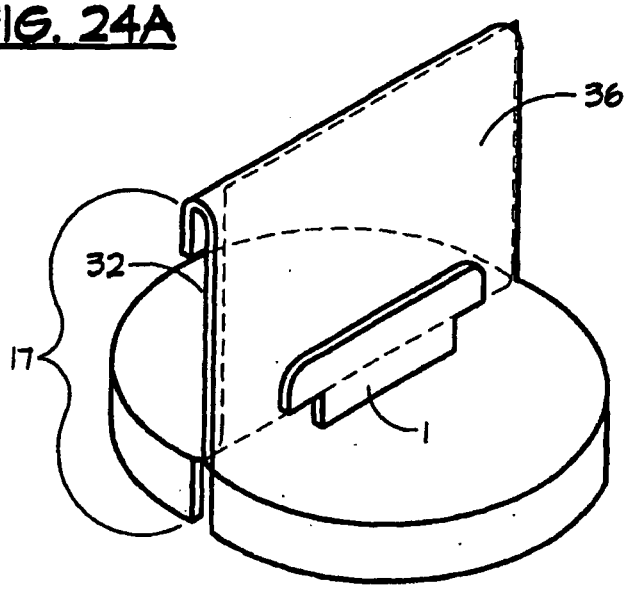

Refer now to FIG. 24B which shows a perspective view of a swan mount 18 and duck mount 19 mounted together forming a two-piece heavy-duty core bracket 17. This view has rotated 180° from FIG. 23A, so the bayonet 1 is toward the viewer. When the core circle is drilled into a concrete floor, epoxy and the heavy-duty core bracket 17 are inserted into the core circle. The bayonet 1 would face away from window to be protected, and the rib 32 would face the window. The rib 32 and attached web 36 add great strength in all directions.

FIG. 25

Figure 25A:
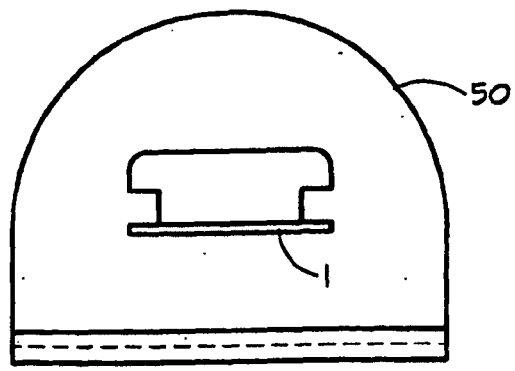
Figure 25:
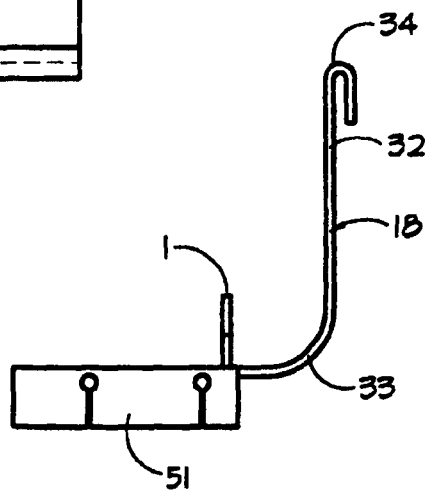

Refer now to FIG. 25 which shows a side view of a swan mount 18 with bayonet 1, skirts 51, cap bend 33, rib 32, and gooseneck bend 34.

FIG. 25A

Refer now to FIG. 25A which shows a top view of a swan mount 18 with bayonet 1, circumference bend 50, and gooseneck bend 34.

FIG. 26

Figure 26A:
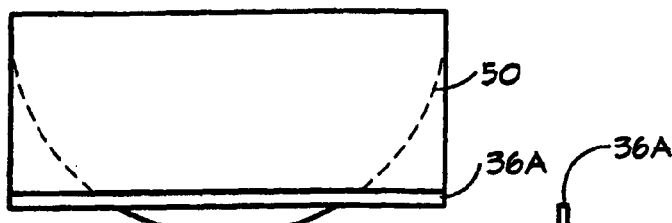
Figure 26:
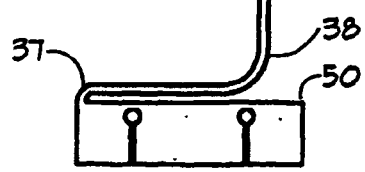

Refer now to FIG. 26 which shows a side view of a duck mount 19 showing the circumference bend 50, overthrust bend 37, web bend 38, web 36, and web top 36A.

FIG. 26A

Refer now to FIG. 26A which shows a top view of a duck mount 19 showing the circumference bend 50 and web top 36A.

FIG. 27A

Figure 27:
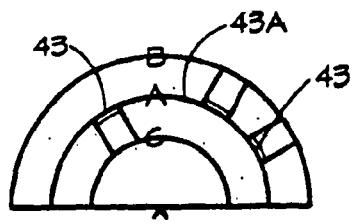
FIGS. 27-28G show another embodiment of the floor mount.
Figure 27B:
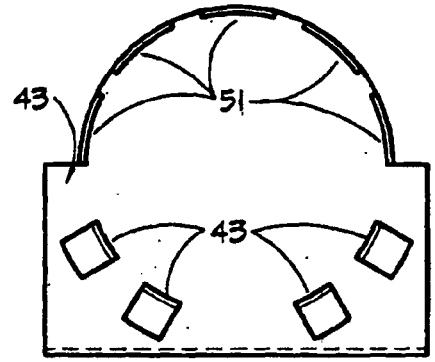
Figure 27C:
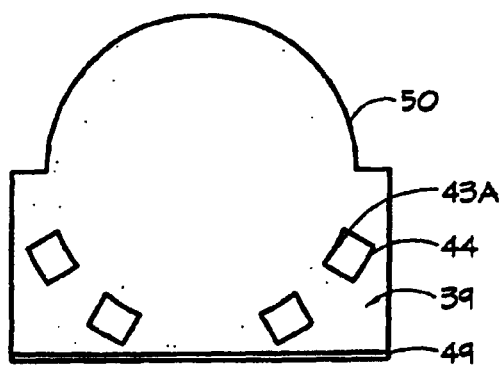
Figure 27A:
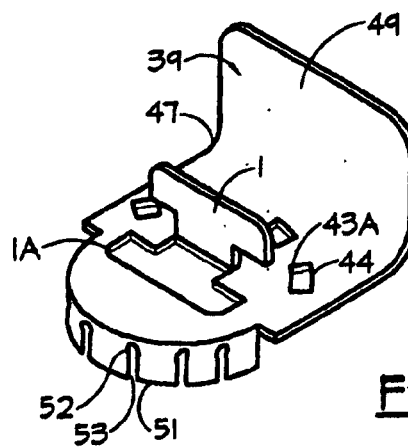

Refer now to FIG. 27A which shows another embodiment of a floor mount 7, core mount 15, and heavy-duty core bracket 17. FIG. 27A shows a perspective view of a one-piece heavy-duty clip 39. The bayonet 1, circumference bend 50, radius notches 52, stress relievers 53, and skirts 51, the same as on previous brackets, are shown toward the front. The bayonet cutout 1A is shown clearly in this view.

Toward the rear, slit skirt cut-outs 44 form slit skirts 43 by a right-angled skirt bend 43A. The slit skirts 43 are the same length as the skirts 51, and are in the same circumference circle. A right-angle bend at the rear bend 47 forms the rear web 49. The rear web 49 adds great strength to the clip.

The heavy-duty clip 39 is inserted into a drilled core circle with epoxy, similar to the core mount 15 and heavy-duty core bracket 17. A plywood bracket 60 and shutter cover 48 are latched to the bayonet 1 as described for the plywood bracket 60.

FIG. 27B

Refer now to FIG. 27B which shows a bottom view of a heavy-duty clip 39. The skirts 51 and slit skirts 43 are shown projecting toward the viewer, forming a circle that is the same diameter as a drilled core circle. The bayonet 1 is omitted for clarity in this view.

FIG. 27C

Refer now to FIG. 27C which shows a top view of a heavy-duty clip 39, showing the circumference bend 50, top edge of the rear web 49, slit skirt cut-outs 44, and skirt bend 43A.

FIG. 27D

Figure 27D:
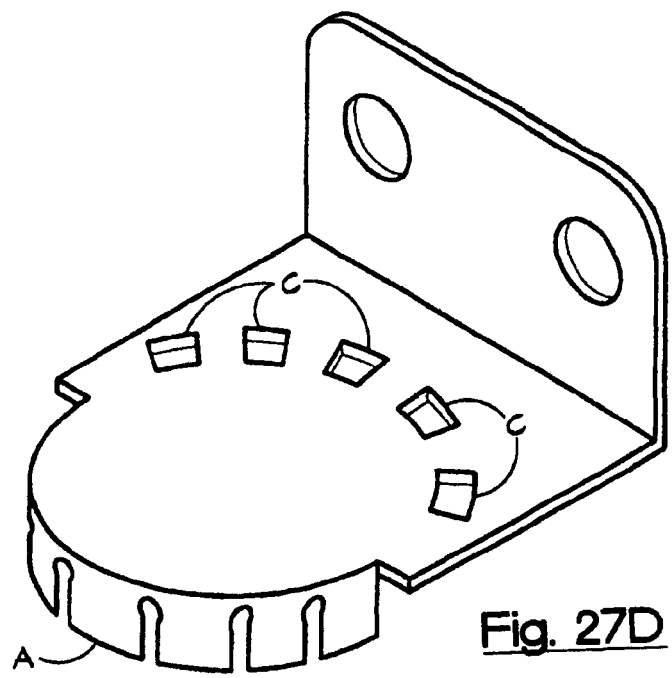

Refer now to FIG. 27D which shows that the slit skirts 43 could be formed in two ways. Circumference A is the circumference of a core drill. The slit skirts 43 could be cut at A-C and bent downward, or cut at A-B and bent downward. The skirt bend 43A is still at circumference A.

FIG. 27E

Figure 27F:
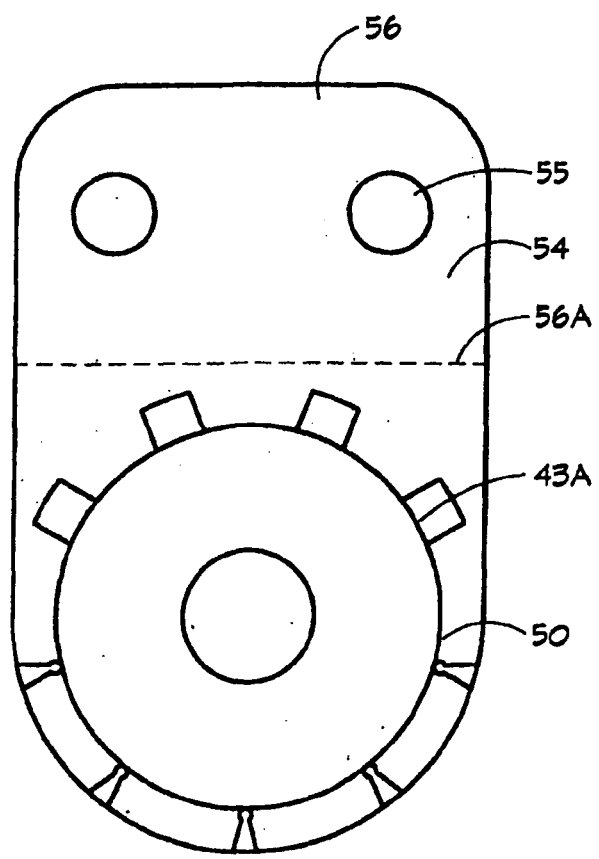
Figure 27E:
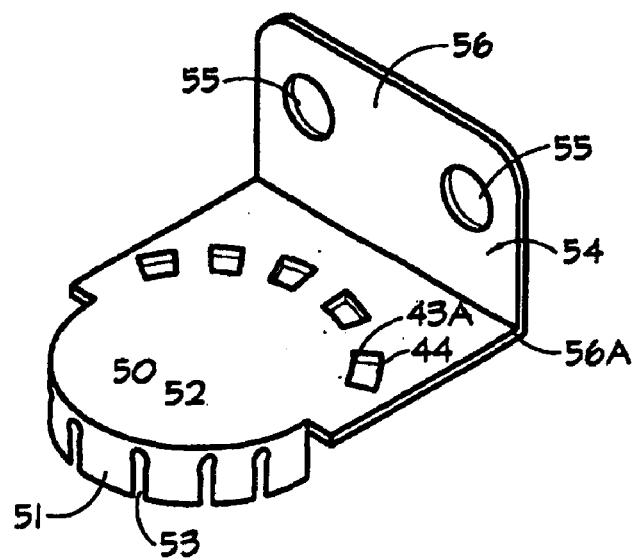

Refer now to FIG. 27E which shows an embodiment of a heavy-duty clip 39, the pipe clip 54. Everything on the front is the same as the heavy-duty clip 39 except for the rear tab 56, which has pipe holes 55. The pipe clip 54 is inserted into a drilled core circle with epoxy, the same as a heavy-duty clip 39 except the pipe clip is rotated 90° so the rear tab 56 is perpendicular to the window. Standard pipes are inserted through the pipe holes 55 as shown on FIGS. 28E and 28F.

FIG. 27F

Refer now to FIG. 27F which shows a flat pattern layout of a pipe clip 54.

FIG. 28A

Figures 28C, 28D:
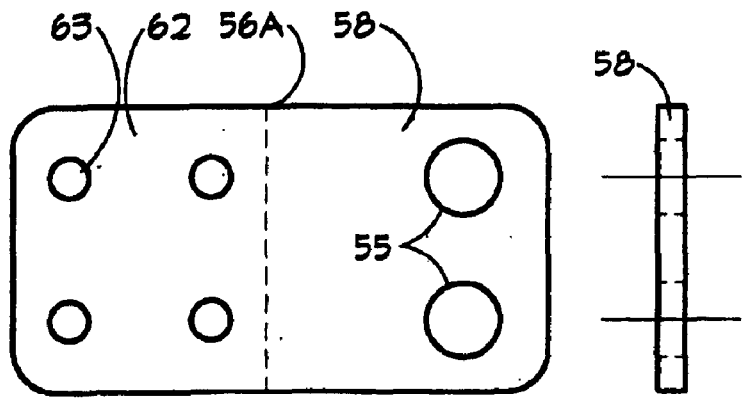
Figures 28A, 28B:
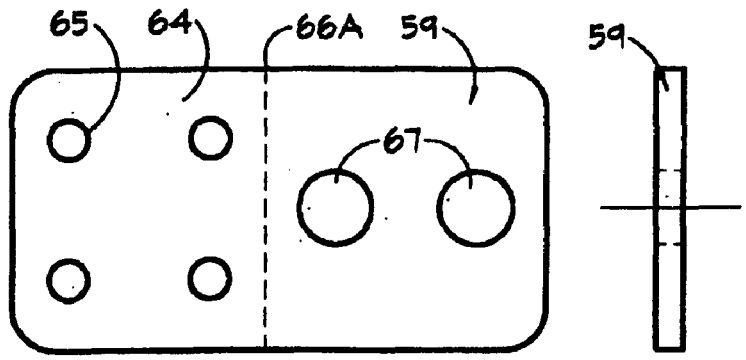

Refer now to FIG. 28A which shows a flat pattern layout of a pipe wall mount 59, prior to bending at the nose tab bend 66A.

FIG. 28B

Refer now to FIG. 28B which shows a side view of a pipe wall mount 59, prior to bending at the nose tab bend 66A.

FIG. 28C

Refer now to FIG. 28C which shows a flat pattern layout of a pipe floor mount 58, prior to bending at the rear tab bend 56A.

FIG. 28D

Refer now to FIG. 28D which shows a side view of a pipe floor mount 58, prior to bending at the rear tab bend 56A.

FIG. 28E

Refer now to FIG. 28E which shows a perspective view of a pipe floor mount 58 bent at the rear tab bend 56A. The floor web 62 is shown mounted to the floor with bolts through bolt holes 63. Pipes 57 are shown going through the pipe holes 55 on the rear tab 56.

FIG. 28F

Refer now to FIG. 28F which shows a perspective view of a pipe wall mount 59 bent at the nose tab bend 66A. The wall web 64 is shown mounted to the wall with bolts through bolt holes 65. Pipes 57 are shown going through the pipe holes 55 on the nose tab 66.

FIG. 28G

Refer now to FIG. 28G which shows a safety pin 67 for securing pipe 57 to the pipe floor mount 58 and pipe wall mount 59. The safety pin 67 is bent from standard wire into the preferred shape. The tight opening 68 fits around the pipe 57 and the wrap 69 fits tightly to the pipe 57. The tang 70 is on one side of the nose tab 66 on the pipe wall mount 59, or on one side of the rear tab 56 of the pipe floor mount 58 and the opposite tang 71 is on the opposite side. This safety pin 67 quickly ties the pipe 57 to the rear tab 56 or nose tab 66.

FIG. 29A

Figure 29A:
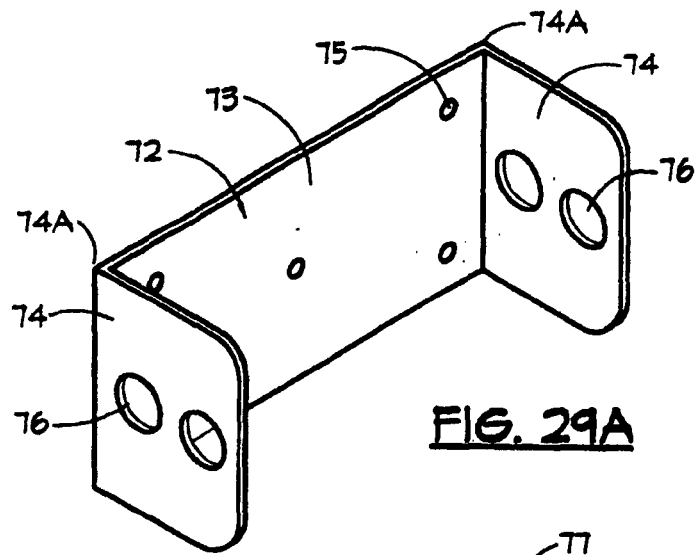
FIGS. 29A-29B show the offset floor mount after bending.
Figure 29B:
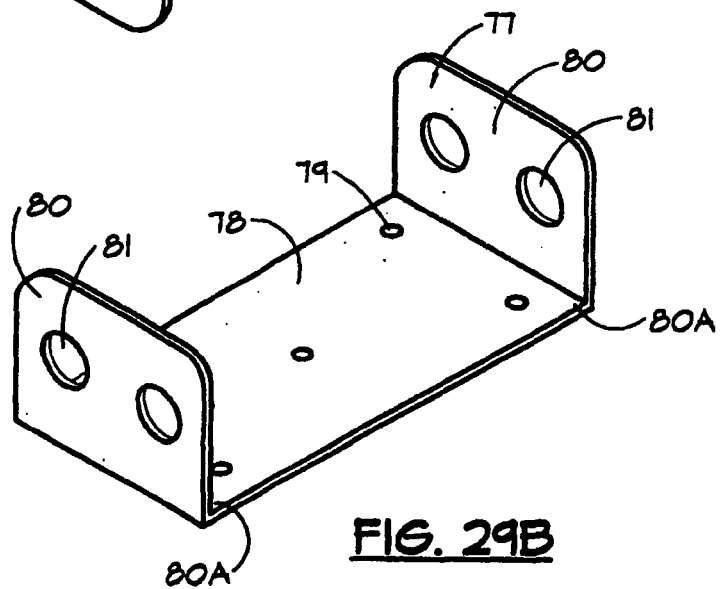
Figure 29:
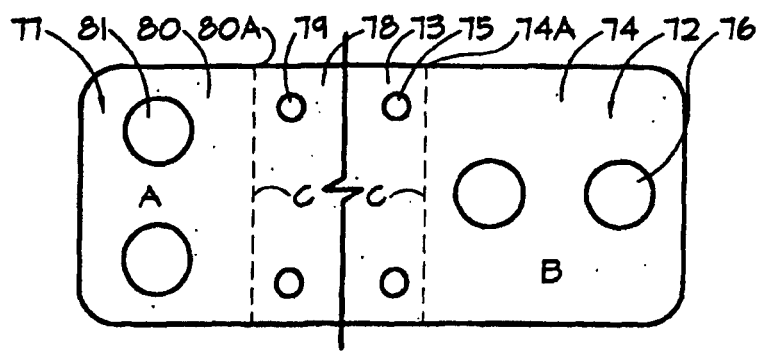
FIG. 29 shows a flat pattern layout for an offset floor mount that uses pipe.

Refer now to FIG. 29A which shows a perspective view of a mid-span wall mount 72 for use across a series of large windows or doors. The wall span 73 is flat and has bolt holes 75 for attachment to a door jamb or window frame. Right-angle dog tab bends 74A form dog tabs 74 that are parallel to each other. The dog tabs 74 contain pipe holes 76.

If a span is large, such as a patio door next to a picture window, the mid-span wall mount 72 can be attached to the door jamb by bolts through the bolt holes 75 on the wall span 73. The dog tabs 74 must be perpendicular to the floor, and the pipe holes 76 should be in line with the pipe holes 67 of a pipe wall mount 59, that is attached to the wall. Plywood is surrounded by pipe 57, as described in FIG. 47C.

FIG. 29B

Refer now to FIG. 47B which shows a perspective view of a mid-span floor mount 77 for use across a series of large windows or doors. The floor span 78 is flat and has bolt holes 79 for attachment to the floor or deck. Right-angle cat tab bends 80A form cat tabs 80 that are parallel to each other. The cat tabs 80 contain pipe holes 81.

If a span is large, such as a patio door next to a picture window, the mid-span floor mount 77 can be attached to the floor by bolts through the bolt holes 79 on the floor span 78. The cat tabs 80 must be perpendicular to the wall, and the pipe holes 81 should be in line with the pipe holes 55 of a pipe floor mount 58, that is attached to the floor. Plywood is surrounded by pipe 57, as described in FIG. 47C.

FIG. 29C

Refer now to FIG. 29C which shows a flat pattern layout for a mid-span wall mount 72 on the right, and a mid-span floor mount 77 on the left. The same tool and die can be used to make both mounts by moving pins for stamping of pipe holes 76 and 81.

FIGS. 30-32

Figure 30:
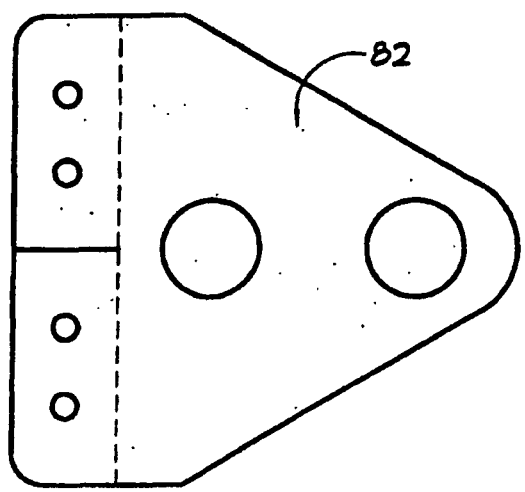
FIG. 30 shows a flat pattern layout for a party floor mount that uses pipe.
Figure 31:
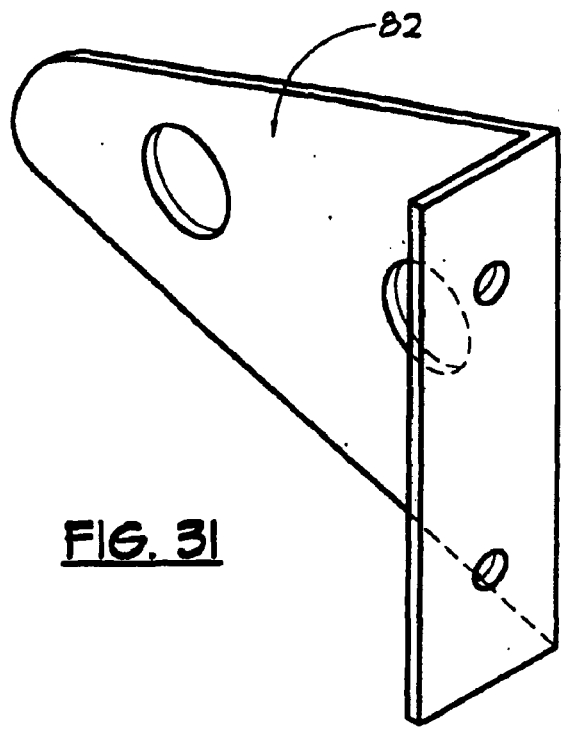
FIGS. 31-32 show the party floor mount after bending.
Figure 32:
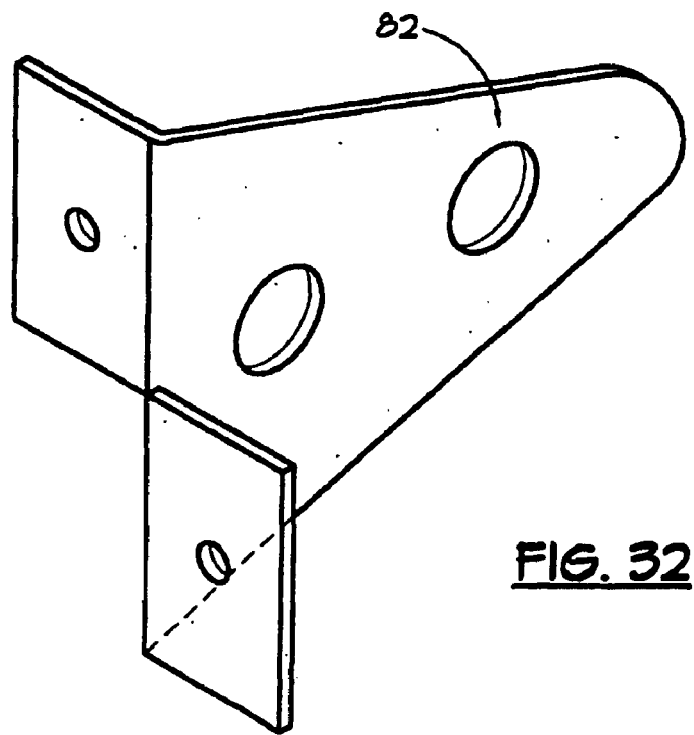

Refer now to FIG. 30 which shows a flat pattern layout of another embodiment, being a triangular wall mount 82. Using pipe 57 to hold down the plywood is ingenious, but there are several ways of holding down the pipe 57. FIGS. 31 and 32 show two variations using different bending.

FIGS. 33-34

Figure 33:
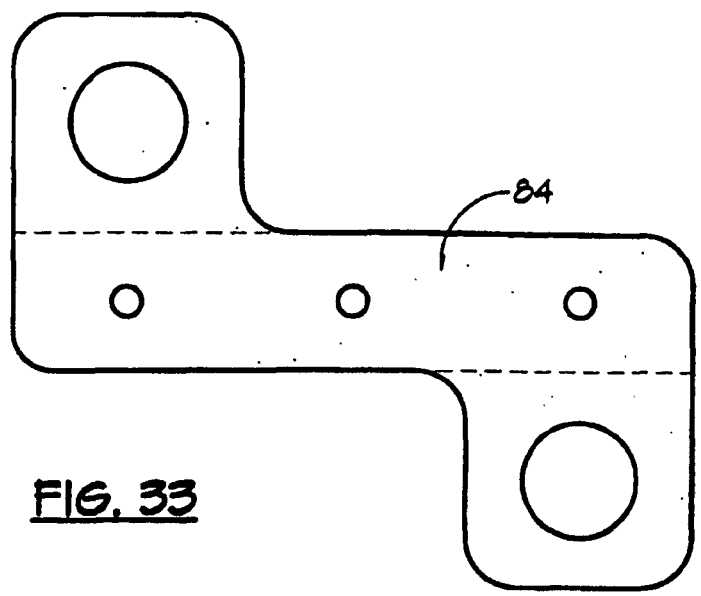
FIGS. 33 and 35 show flat pattern layouts of floor mount embodiments.
Figure 34:
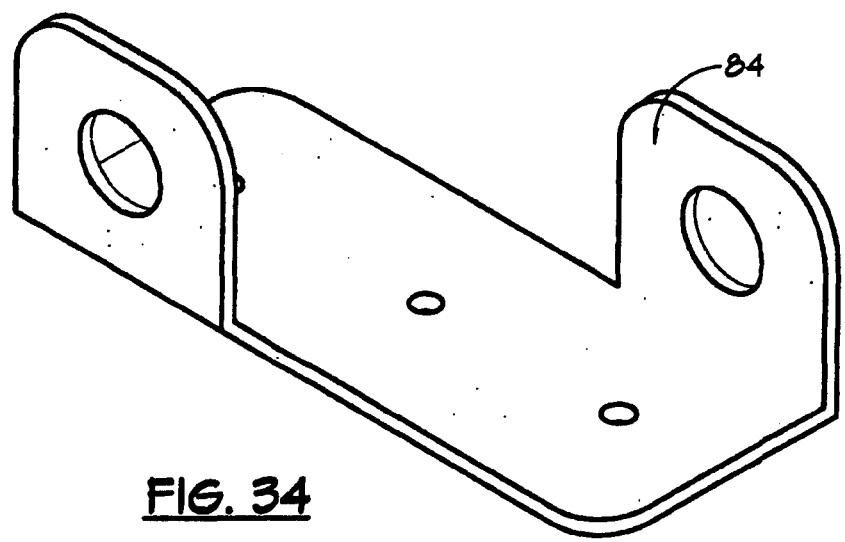
FIGS. 34 and 36 show floor mount embodiments after bending.

Refer now to FIG. 33 which shows a flat pattern layout for an offset floor mount 84, again using pipe 57. FIG. 34 shows the offset floor mount 84 after bending.

FIGS. 35-36

Figure 35:
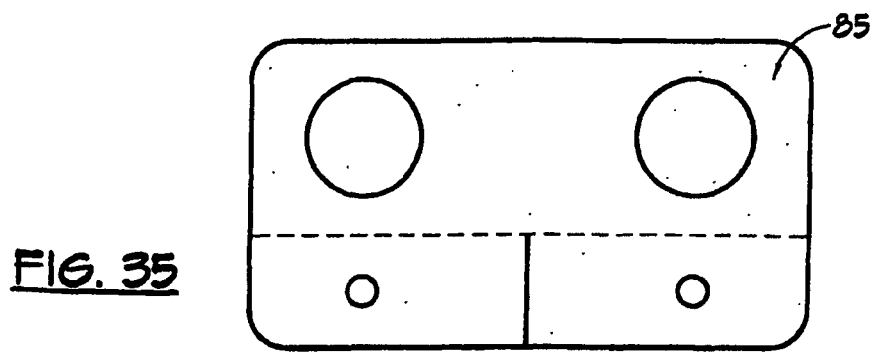
Figure 36:
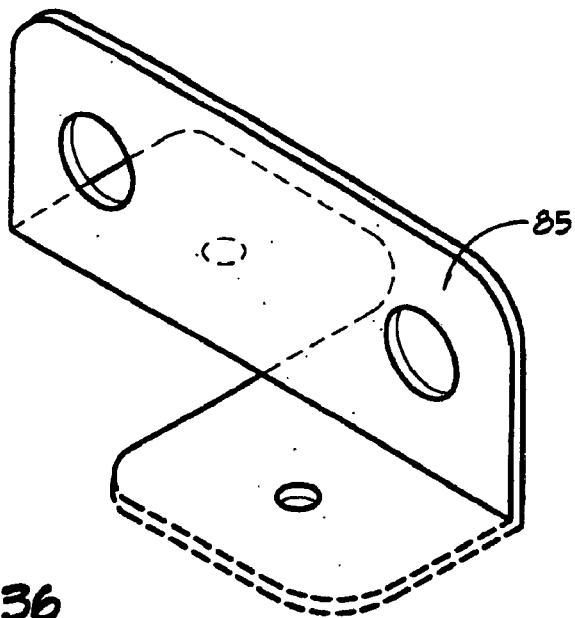

Refer now to FIG. 35 which shows a flat pattern layout for a party floor mount 85, again using pipe 57. FIG. 36 shows the party floor mount 85 after bending.

FIGS. 37A-37C

Figure 37C:
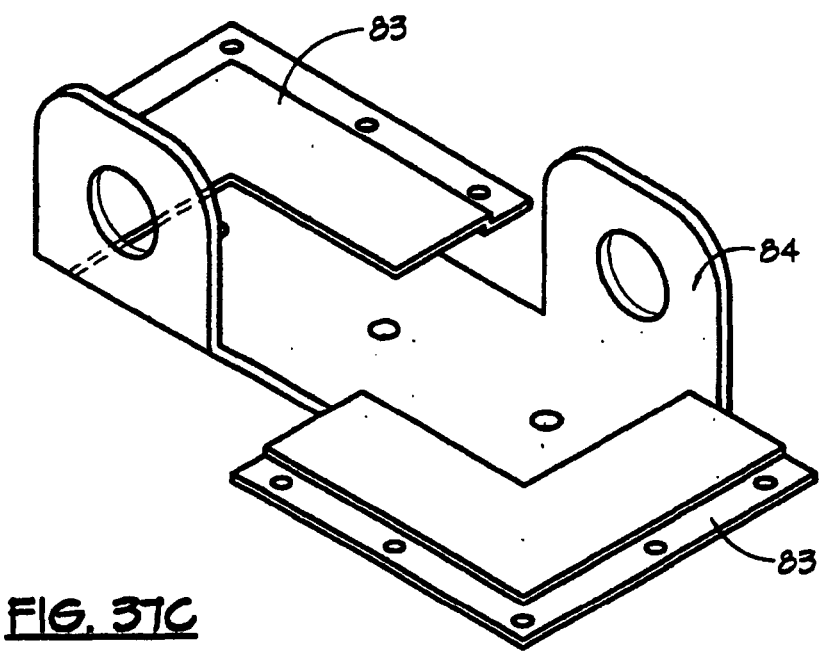
FIG. 37A and 37C show a perspective view of floor mounts latched to brackets.
Figure 37A:
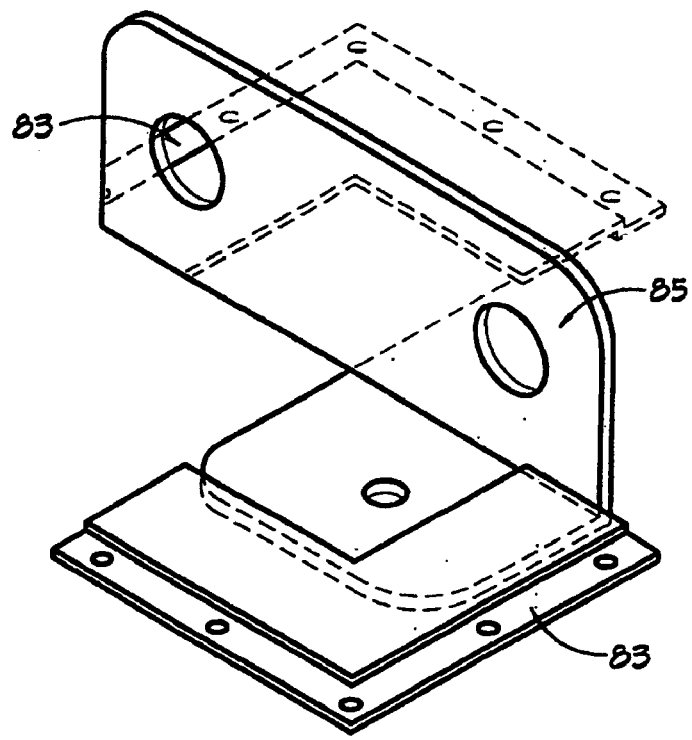

Refer now to FIG. 37A which shows a perspective view of a party floor mount 85 held down securely to a structure by a bracket 83. The bracket 83 is permanently attached to a structure and the party floor mount 85 twists into the bracket 83 when a hurricane is imminent. The bracket 83 protects and adds strength to holding the party floor mount 85, pipe 57, and plywood securely to the house. FIG. 37B shows a perspective view of an offset floor mount 84 held securely to a structure by the same brackets 83.

The bracket 83 would be permanently attached to the house. When a hurricane approaches, a party floor mount 85 or offset floor mount 84 is placed along side the bracket 83 and twisted 90°. This puts the mounts inside the brackets 83. When pipe 57 is inserted through pipe holes of the mounts, the pipe prevents the mounts from twisting back, so the mounts stay in the brackets 83.

FIG. 37C shows a means of attaching the triangular wall mount 82 to the wall using the same brackets 83. The brackets 83 are secured to the wall with the triangular wall mount 82 in the correct position. The triangular wall mount 82 is then twisted 90° counter-clockwise, releasing itself from the bracket 83. The bracket 83 stays permanently attached to the wall. When a hurricane comes, the triangular wall mount 82 can be quickly inserted into the bracket by twisting 90° clockwise. Pipe 57 keeps the triangular wall mount 82 from twisting, when the pipe 57 and plywood are installed. The party floor mount 85 and offset floor mount 84 are installed with brackets 83 in the same way.

FIG. 38

Figure 38:
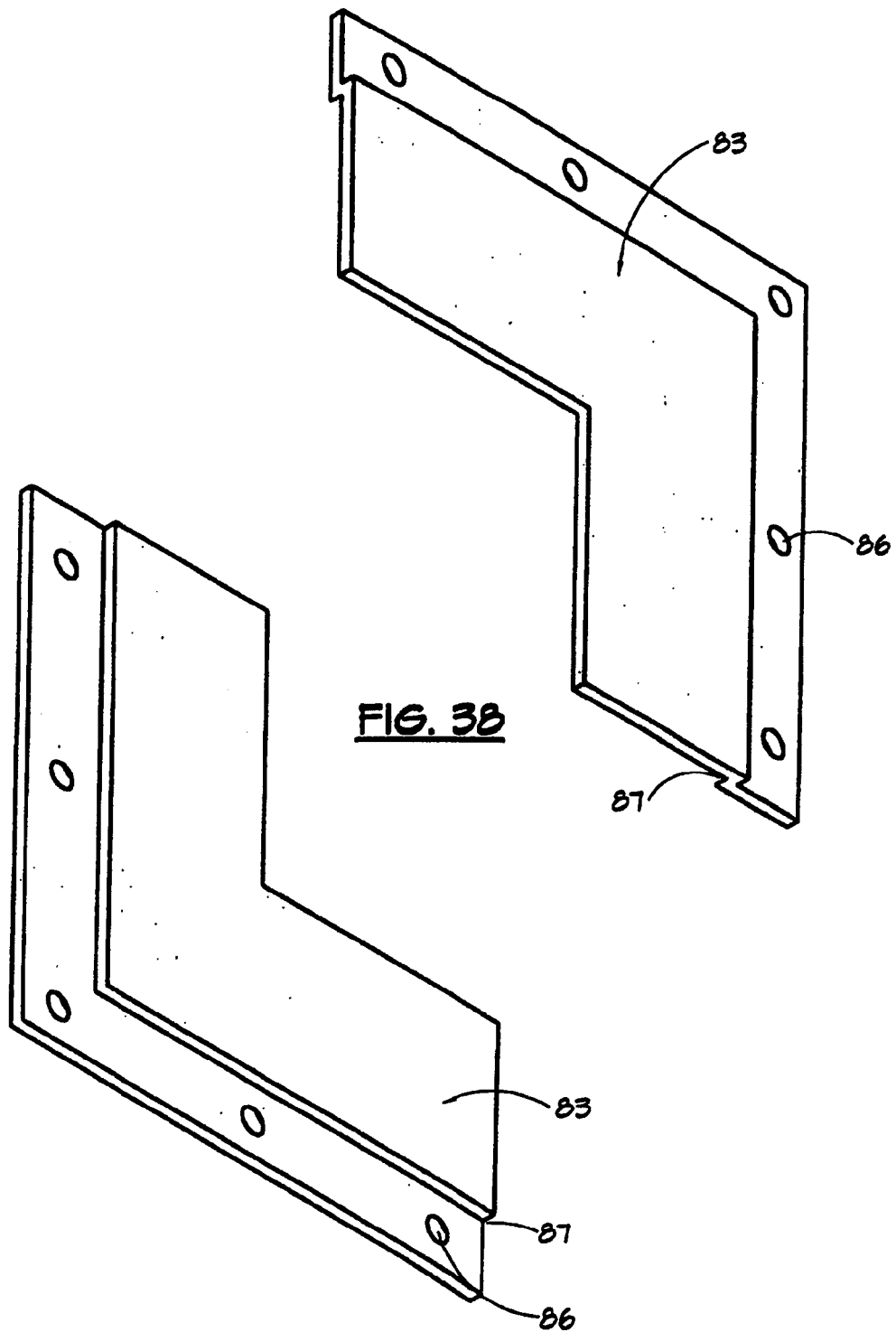
FIG. 38 shows a perspective view of brackets.

Refer now to FIG. 38 which shows a perspective view of two brackets 83. The brackets are permanently attached to a structure using bolts through bolt holes 86. The lip 87 provides an offset, whereby a triangular wall mount 82, offset floor mount 84, or party floor mount 85 can be inserted in the brackets 83 by twisting the mounts 90° clockwise.

The shutter is locked using wingnuts of my previous patent application Ser. No. 08/597,194 of February 1996.

FIG. 39A

Figure 39A:
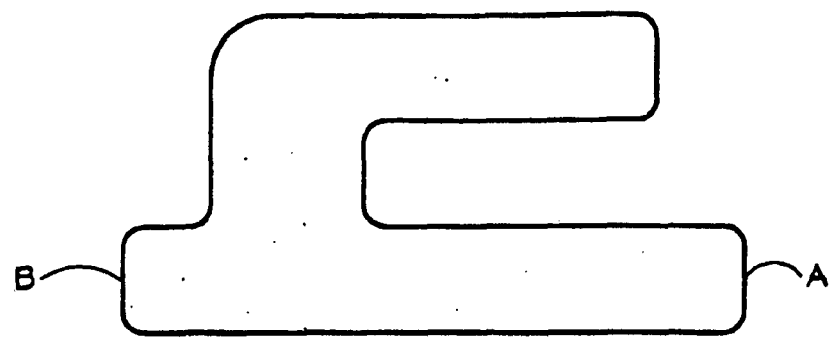
FIGS. 39A-39E show an embodiment of a hook latch.

Refer now to FIG. 39A which shows another embodiment. FIG. 39A shows a flat pattern layout of a hook latch 88 prior to bending. FIG. 39A shows the semi circle base 89, catch opening 90, and latch top 91.

FIG. 39B

Figure 39B:
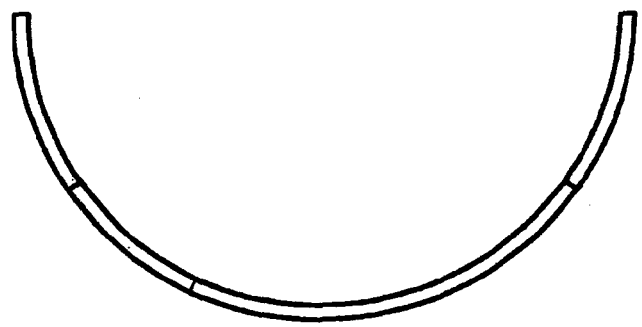

Refer now to FIG. 39B which shows a top view of a hook latch 88 after bending. The diameter of the semi-circular base 89 and latch top 91 is similar to a circular core drill mentioned previously. This view shows that another hook latch 88 can be placed next to this hook latch 88, forming a mostly complete circle, with a circumference equal to a drilled core circle. When a core drill circle is drilled in concrete, epoxy and two hook latches 88 can be inserted with the semi circle base 89 locked into the epoxy with the latch top 91 and catch opening 90 facing toward the window and away from the window.

FIG. 39C

Figure 39C:
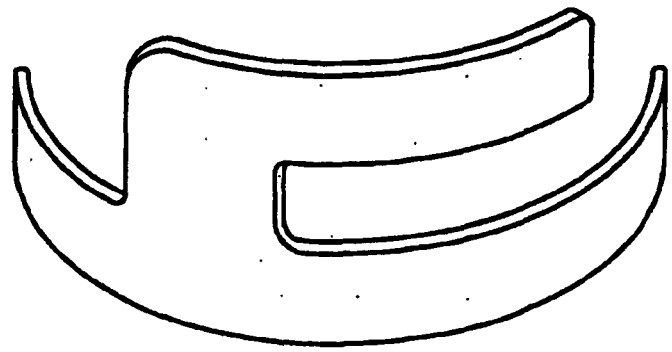

Refer now to FIG. 39C which shows a perspective view of a hook latch 88 showing the semi-circle base 89, catch opening 90, and latch top 91.

FIG. 39D

Figure 39D:
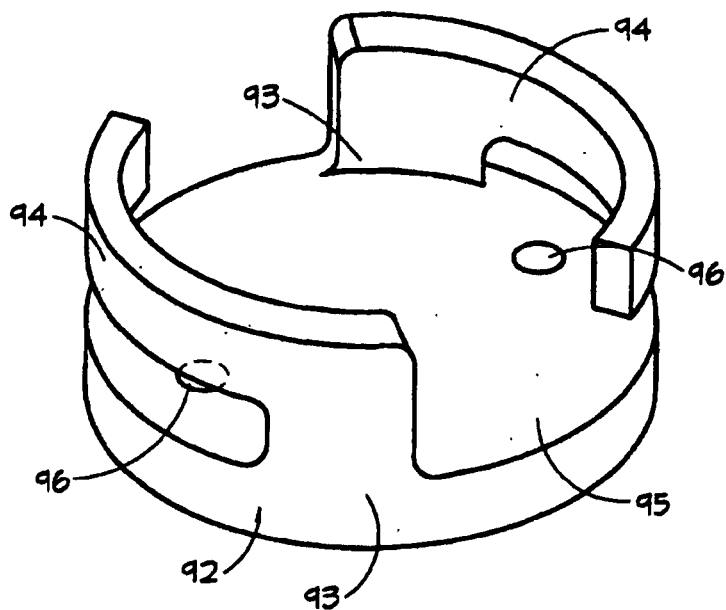

Refer now to FIG. 39D which shows an embodiment of a hook latch 88. The one-piece base hook latch 92 has the same circumference as a hook latch 88, but has both latches together on a plate that can be bolted to wood or concrete. The base plate 95 has bolt holes 96 for attachment to wood or concrete. The latch tabs 94 are similar to the latch top 91 on the hook latch 88. The base hook latch 92 is formed with a circular base plate 95 and the latch tabs 94 are bent up at a generally right angle circular bend at the latch tab bend 93.

The base hook latch 92 is bolted to the structure with latch tabs 94 facing toward the window and away from the window.

FIG. 39E

Figure 39E:
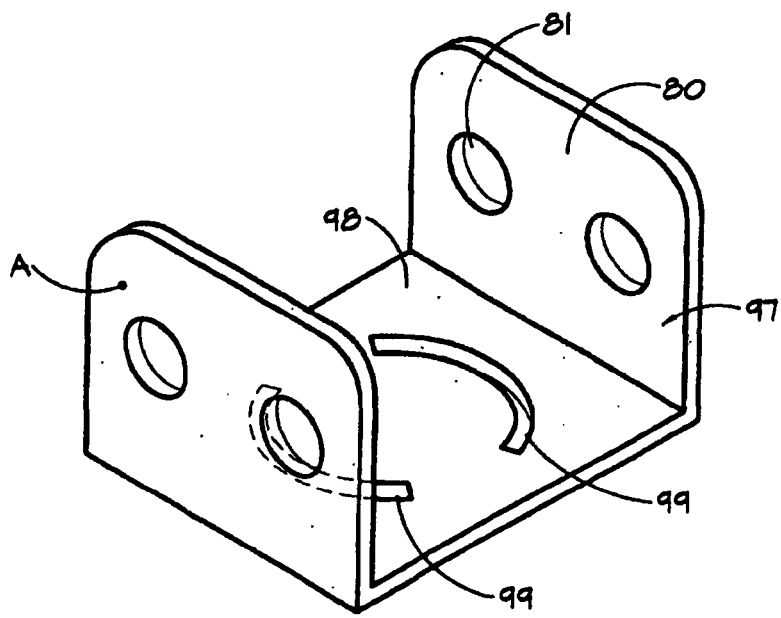

Refer now to FIG. 39E which shows an embodiment of a mid-span floor mount 77, The mid-span floor latch 97 is the same as the mid-span floor mount 77 except the latch span 98 has latch cut-outs 99. The latch cut-outs 99 fit over latch tabs 94 on the base hook latch 92 or over the latch top 91 on the hook latch 88. The mid-span floor latch 97 is then rotated 90° and pipe 57 is inserted through the pipe holes 81 preventing twisting off. The mid-span floor latch is securely locked to the floor. The latch cut-outs 99 can also be put onto the wall span 73 of a mid-span wall mount 72.

FIG. 40A

Figure 40A:
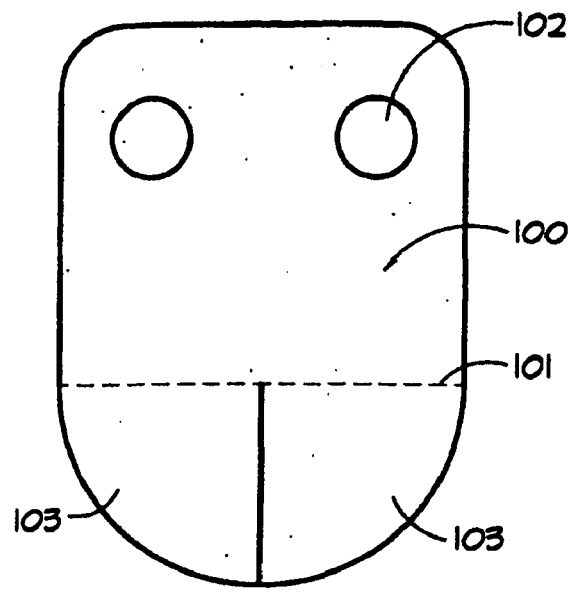
FIGS. 40A-40C show an embodiment of a twist mount.

FIG. 40A shows an embodiment of a floor mount. FIG. 40A shows a flat pattern layout of a twist mount 100 with twist bend 101 and pipe holes 102. The use and operation of pipe holes 102 have been discussed previously. The twist bend 101 can be bent in two directions.

FIGS. 40B-40C

Figure 40B:
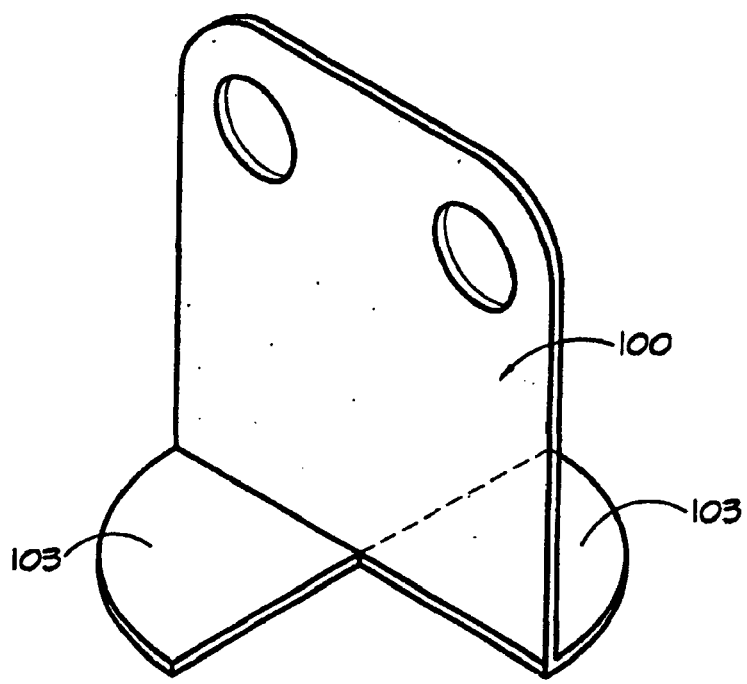
Figure 40C:
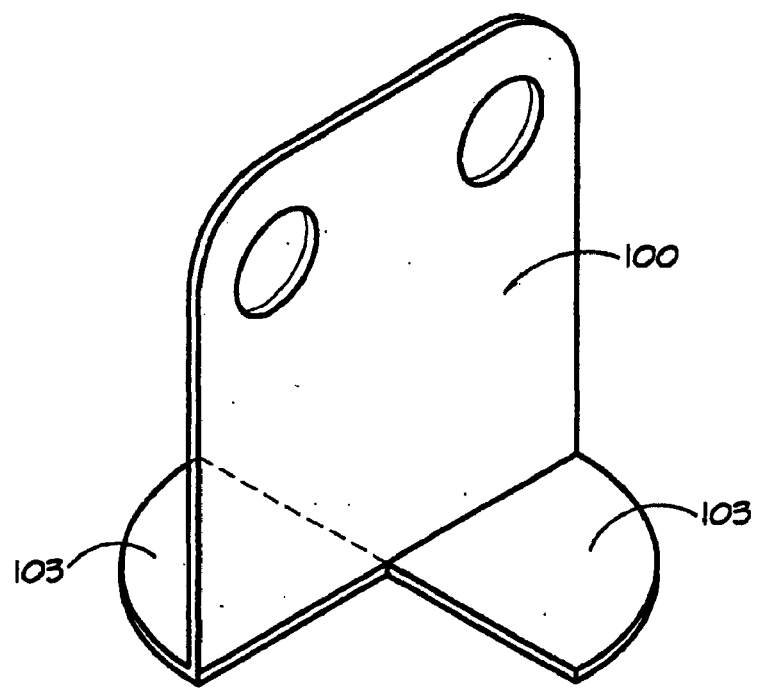

FIGS. 40B-40C show bending the wing tabs 103 in different directions forms a twist mount 100 that can be mounted 90° in different directions using twist docks 104.

FIGS. 41A-41B

Figure 41A:
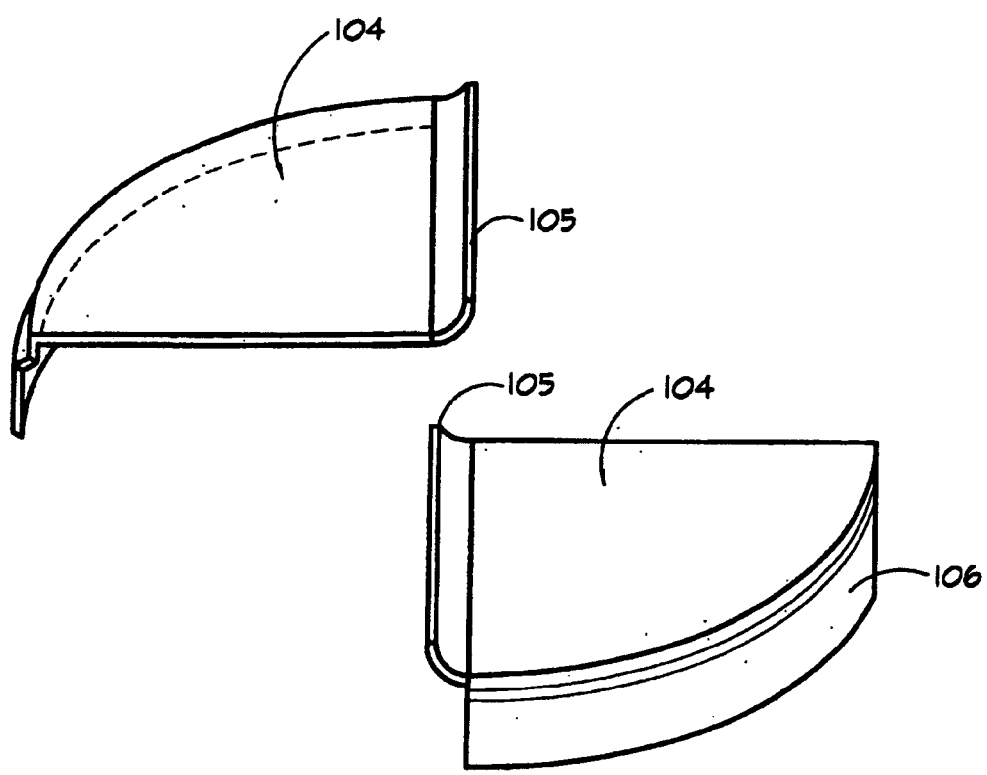
FIGS. 41A-41B show a flat pattern layout of a twist dock.
Figure 41B:
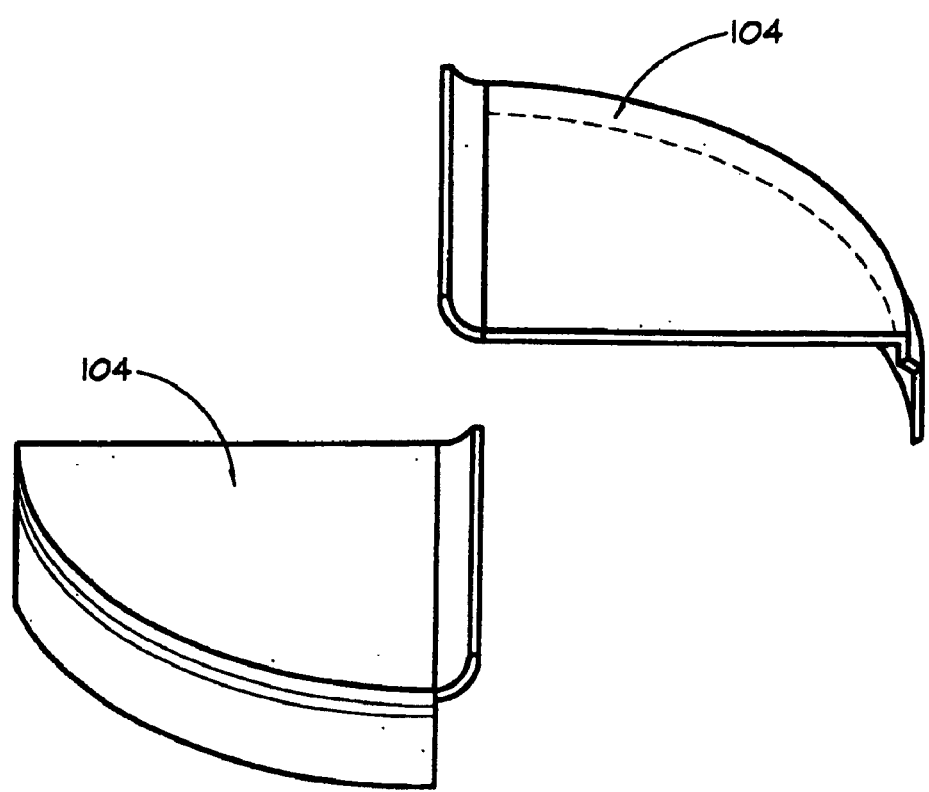

FIGS. 41A-41B show twist docks 104 with a circle dock 106 that has the same diameter as a core drill circle described previously. The core drill drills a core circle and epoxy and two twist docks 104 are inserted into the epoxy with the circle dock 106 in the epoxy. FIGS. 41A and 41B show how they could be set into the epoxy. They will not be noticed. When a hurricane comes, the twist mounts 100 can be inserted into the twist-docks 104 and rotated 90°. Pipes 57 through the pipe holes 102 will prevent twisting and pullout. They could be mounted on a masonry wall with the location of the pipe holes 102 changed slightly. Operation is the same as other pipe-using brackets.

FIG. 42A-42B

Figure 42A:
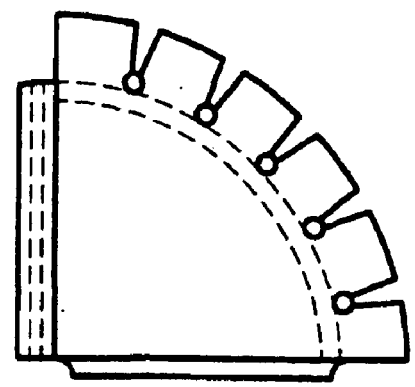
FIGS. 42A-B show how bending the wing tabs in different directions forms a twist mount that can be mounted 90 degree in different directions using twist docks.
Figure 42B:
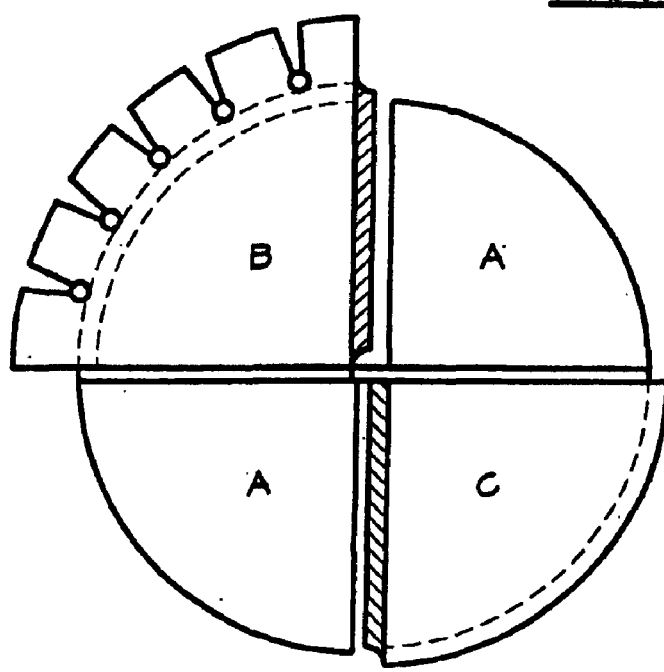
Figure 43A:
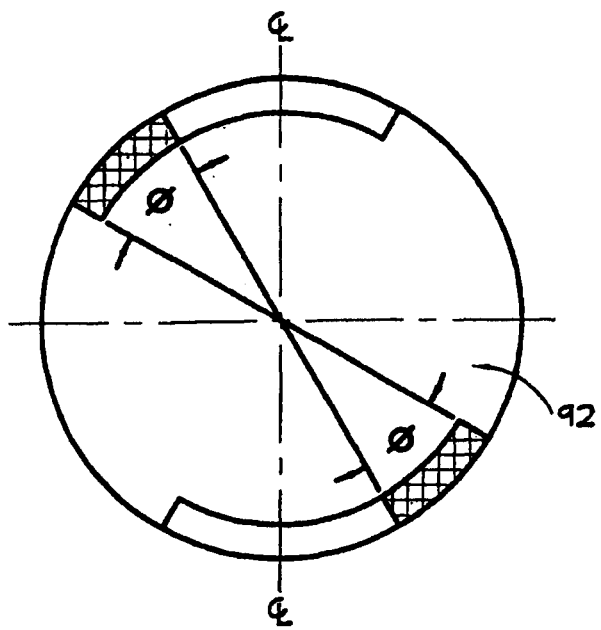
FIGS. 43A-C show twist docks with a circle dock.
Figure 43B:
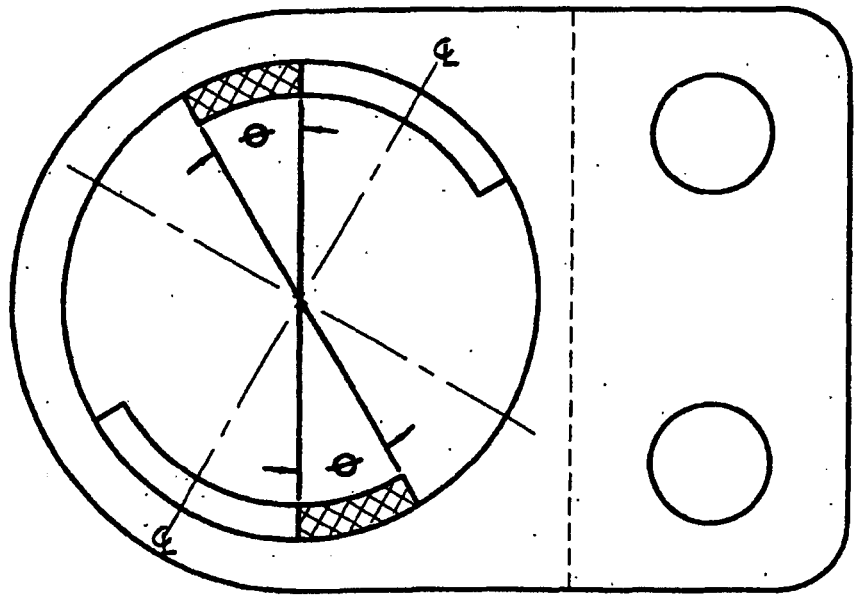
Figure 43C:
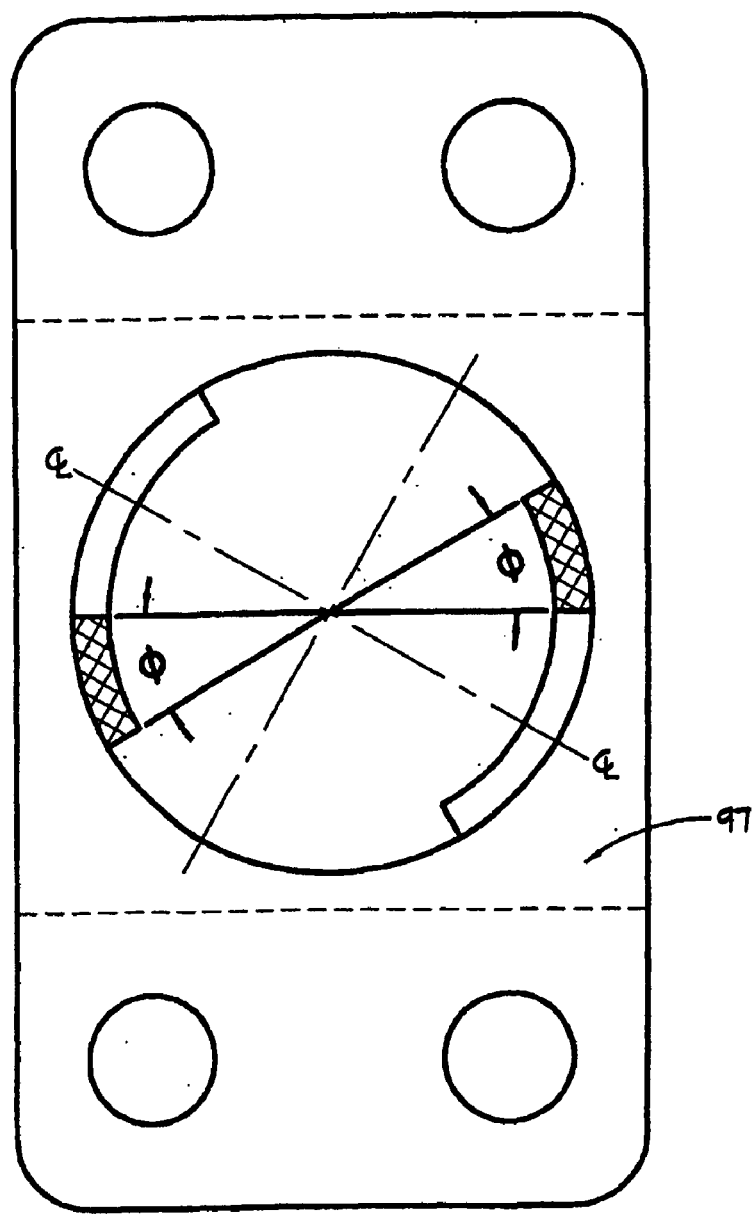

Refer now to FIG. 42A which show how the flat pattern layout looks before cutting and bending. FIG. 42B shows before and after cutting and bending.

FIGS. 43A-43C

Refer now to FIGS. 49A-49C which show the locking angles for a base hook latch 92 and mid-span floor latch 97. FIG. 49B shows a single mid-span floor latch 107. The pipe holes could be moved for use as a wall mount.

FIGS. 44A-44F

Figure 44A:
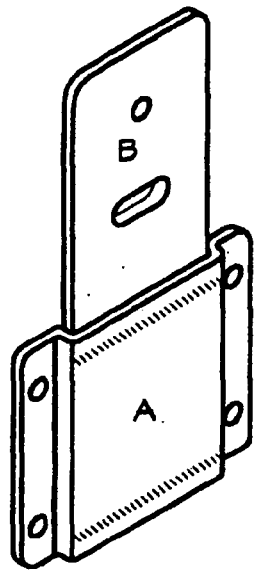
FIG. 44A shows a perspective view of a plywood latch.

FIG. 44A shows a perspective view of a receiver 109 and tongue 108 locking two sheets 126 together. The tongue 109 is held to the top sheet 126 with a bolt through a bolt hole 110 and a bolt held by a tee retainer 115. The tongue 109 is shown inserted into the receiver 108 which is bolted to the lower sheet 126 by bolts through bolt holes 112.

Figure 44B:
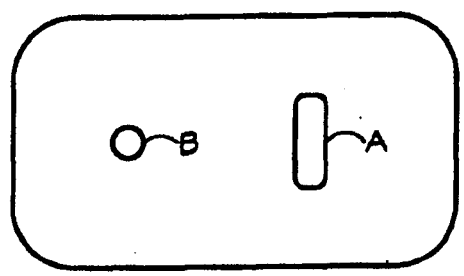
FIGS. 44B-F show embodiments of plywood latches.
Figure 44C:

FIG. 44B shows a flat pattern layout of a tongue 109 with the bolt hole 110 and adjustable bolt hole 111. FIG. 44C shows a side view of the tongue 109.

Figure 44E:
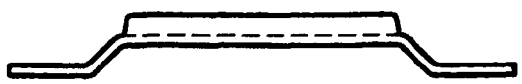
Figure 44F:
Figure 44D:
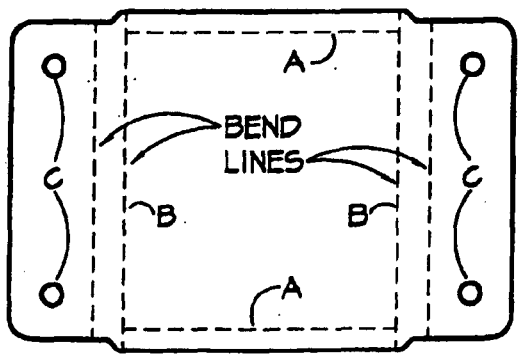

FIG. 44D shows a flat pattern layout for a receiver 108 before bending at the ess bendlines 113 and flare out bends 114. FIG. 44E shows a top view of a receiver 108 after bending at the ess bendlines 113 and flare out bends 114. FIG. 44F shows a side view of a tee retainer 115. The tee retainer 115 is screwed onto a bolt to hold down the tongue 109, as shown in FIG. 44A.

FIGS. 45A-45B

Figure 45A:
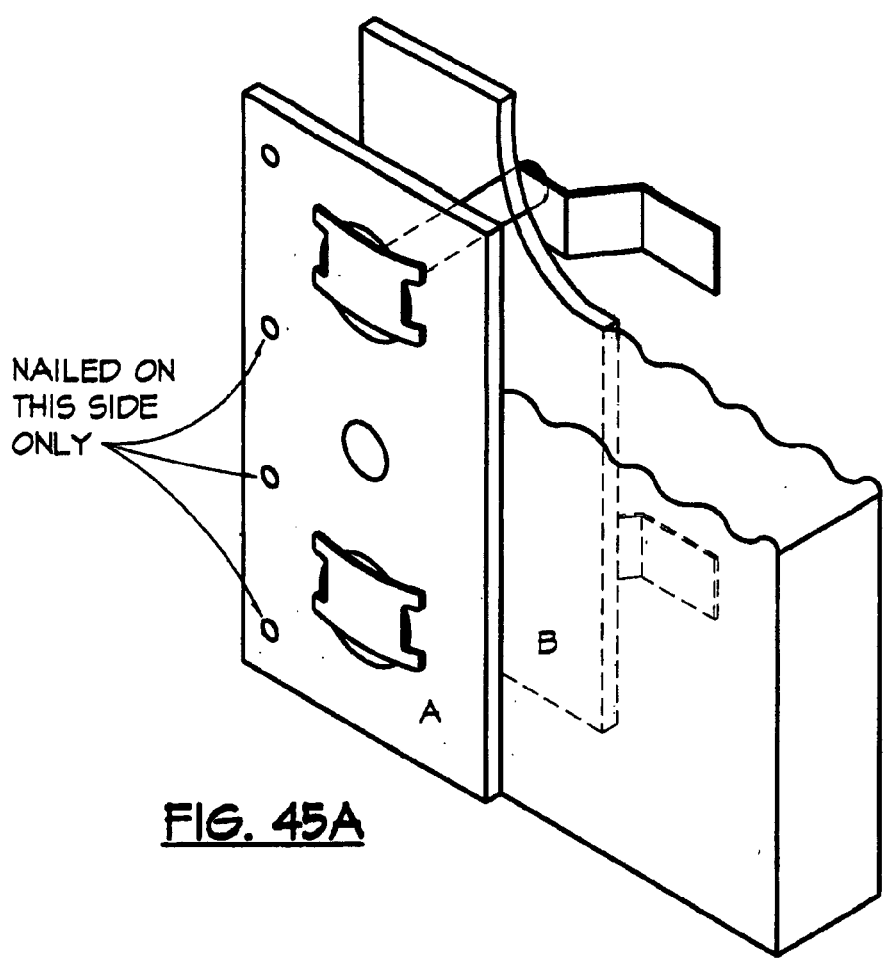
FIGS. 45A-B show plywood latch embodiments on plywood.

FIG. 45A shows a sandwich plate 116 and inner sandwich plate 124 holding together two sheets 126. FIG. 45A shows carriage bolts 123 inserted through the sandwich plate 116, through the sheets 126, through the inner sandwich plate 124, and tightened down with wingnuts 125. The heads of the carriage bolts 123 are kept from pushing out by bolt holders 120. The thin steel is shown wrapped around the bolt head and snapped into the lips 117.

Figure 45B:
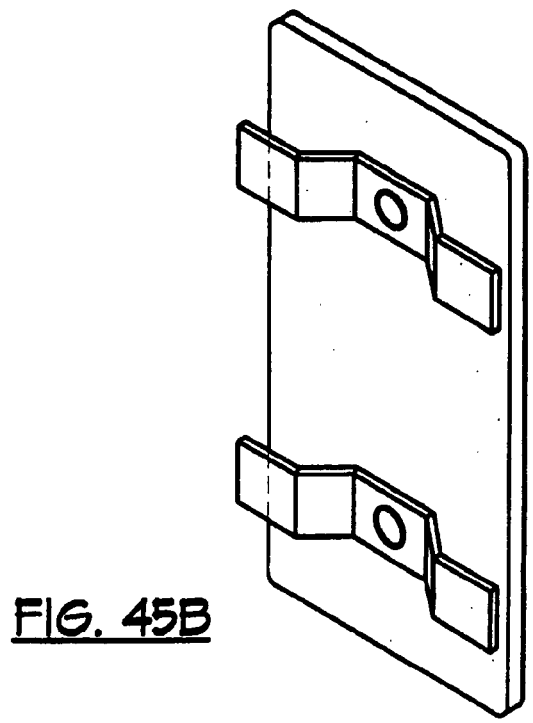

FIG. 45B shows a view of the inner sandwich plate 124 with the wingnuts 125 tightened down onto the carriage bolts 123.

FIGS. 45C-45G

FIG. 45C shows a flat pattern layout of a sandwich plate 116 with nailholes 118, carriage holes 122, bolt hole 119, and lips 117, that are slightly raised.

FIG. 45D shows a side view of an embodiment of a boltholder 120. The thin clip 121 works like a boltholder 120 fitting between the lips 117 and over the head of a carriage bolt 123 as shown on FIG. 45A.

FIG. 45E shows an edge view of a boltholder 120. This shows how the thin edge can fit under the lips 117 on the sandwich plate 116 and over the bolt head 122.

FIG. 45F shows a front view of a boltholder 120. This shows how the left and right edge fits under the lips 117 and over the bolt head of the carriage bolt 122.

FIG. 45G shows a flat pattern layout of a front sandwich plate 124 with bolt holes 119.

FIGS. 46A-46C

FIG. 46A shows how a sandwich plate 116 can use a smaller sheet 126 as a front sandwich plate to tie two sheets 126 together as a shutter. Wingnuts 125 can tie the sheet 126 down onto the carriage bolts 123.

FIG. 46B shows how two keyhole brackets 127 can tie two sheets 126 together like FIG. 46A. Heads of carriage bolts 123 can be inserted into the keyhole brackets 127 and the sheet from FIG. 46A can be placed over the carriage bolts 123 exactly as shown in FIG. 46A.

FIG. 46C shows how a tongue 109 and receiver 108 can also be used horizontally to tie two sheets 126 together.

CONCLUSION, RAMIFICATIONS, AND SCOPE OF INVENTION

Accordingly, the reader will see that the hurricane shutter hardware of the invention are simple, strong, inexpensive, and easy to install. The invention provides a means of quickly attaching a large covering over a vast window or door that can withstand wind, wind-driven missiles, and heavy rain.

To prevent hurricane damage, engineers have maintained that the roof must be held down and wind and rain must be prevented from entering a house. In the future, building codes may require new houses built in hurricane-prone areas to have shutters that will keep out wind-driven rain and debris. This invention provides a low-cost, easy to install and remove, safe and reliable means of protecting large windows and doors. This invention can be retro-fit onto new and older homes built of wood or masonry.

This invention concerns the hardware for attaching a covering over a large window or door. Brackets are permanently attached to the wall or floor framing a large window or door. Locking brackets are permanently attached to the window shutter which can be made of almost any strong material.

The homeowner supplies the covering material that is contiguous to his or her area. The covering material can be made of plywood, bamboo, aluminum, steel, acrylic sheet, kevlar or other lightweight and strong material that may be invented in the future. The shutters can be made from recycled steel, aluminum, or car tires. Shutters can have more than one use. As long as the homeowner can lift the shutter material, almost any thickness of material can be accommodated. The thinner and stronger the material, the more security and ease of storing the shutters for future use.

The shutters can be stored in a basement, crawlspace, garage, or shed. As photovoltaic's decrease in price, they could be attached to the inside part of the window shutters, and be attached to the roof, supplying electricity to the house when a hurricane is eminent, the homeowner removes the panels from the roof, and turns them so the photovoltaic's are on the inside of the window, giving the shutters two important uses.

The shutters can be made from two or more materials. They could have thin steel on the inside, with a rubberized coating on the outside to absorb and dampen shocks from wind-borne missiles. Or it could have lightweight aluminum on the inside, with neoprene on the outside. The shutter could have lightweight honeycomb structures on the inside to provide strength, and a thin coating of metal on the inside part, facing the window, and neoprene on the outside. Plywood was used in the past, because it was plentiful and cheap. New recycling and reusing of materials may make these shutters very economically and environmentally attractive to homeowners and government agencies.

I claim:

1. A method of attaching a bracket to a solid, generally flat surface comprising:
   a. drilling into a surface using a standard coring-bit;
   b. removing the coring-bit, leaving a drilled-out annulus and a cylinder-shaped core;
   c. applying adhesive into said annulus and on top of said core;
   d. applying a bracket having a generally open-can shape with cylinder-shaped sides that slide into the annulus and a generally flat surface that rests on top of the core;
   e. forming a strong bond with the adhesive between the inside surface of the cylinder and the surface of the core, and the outside surface of the cylinder and the outside surface of the drilled annulus, and between the top of the core and the flat surface of the bracket.

2. The method of claim 1 wherein the cylinder-shaped core left by the coring-bit allows a shallower depth than drilling a hole using a standard drill-bit.

3. The method of claim 1 wherein the drilled annulus would contain less volume than a drilled hole, therefore less material is removed from the surface using the coring-bit than when using the standard drill-bit.

4. The method of claim 1 wherein the coring-bit drills shallower and removes less material than a standard drill-bit, therefore less time is consumed when drilling with the coring-bit than when using the standard drill-bit.

5. The method of claim 1 wherein a standard rotary-drill can be used on the coring-bit when drilling in masonry, whereas an uncommon and expensive hammer-drill must be used with a standard drill-bit when drilling in masonry.

6. The method of claim 1 wherein the drilled annulus would contain less volume than a drilled hole, therefore less adhesive is used in filling a drilled-out annulus and core top, than in filling a standard drilled-out hole when using a standard drill-bit.

7. The method of claim 1 wherein friction between both walls of the annulus and the core holds the cylinder of the bracket in place while the adhesive is curing, whereas brackets in standard drill holes can lean to edges of the drilled hole.

8. The method of claim 1 wherein the surface area between the core and the inside of the cylinder, and the inside of the drilled annulus and the outside of the cylinder is much more than the surface area of a bolt inserted into a hole, drilled by a standard drill-bit.

9. A bracket for inserting into a drilled-out annulus, containing an inner core, drilled by a core-bit comprising:
   a. sides being shaped like a cylinder;
   b. one end of the cylinder being open;
   c. the open end of the cylinder having a generally smooth opening and diameter to fit over the core and into the annulus left by a coring bit;
   d. the thickness of said cylinder sides are sized to fit into said annulus;
   e. the other end of said cylinder is closed and the inside surface is flat;
   f. the outside of the closed end contains an attaching web;
   g. the attaching web having an attaching means for temporary or permanent holding of different types of fasteners that need to be secured to a generally flat surface.

10. The bracket of claim 9 wherein the diameter of the cylinder are generally equal to the diameter of a coring-bit, thereby the cylinder slides into the drilled-out annulus left by a coring bit.

11. The bracket of claim 9 wherein the open end of the cylinder, the sides of the cylinder, and the inner top of the bracket is attached to the drilled annulus and core by an adhesive.

12. The bracket of claim 9 wherein the adhesive has generally full contact with the cylinder sides and inner top of said bracket.

13. The bracket of claim 9 wherein the cylinder has at least one space for better gripping of the adhesive.

* * * * *